(12) United States Patent
Lefort

(10) Patent No.: US 12,442,836 B2
(45) Date of Patent: Oct. 14, 2025

(54) PHASE BALANCING STRAP FOR ELECTRICAL SYSTEMS

(71) Applicant: ABB Schweiz AG, Baden (CH)

(72) Inventor: Maxime Lefort, Longueuil (CA)

(73) Assignee: ABB Schweiz AG, Baden (CH)

( * ) Notice: Subject to any disclaimer, the term of this patent is extended or adjusted under 35 U.S.C. 154(b) by 228 days.

(21) Appl. No.: 18/463,798

(22) Filed: Sep. 8, 2023

(65) Prior Publication Data

US 2025/0085312 A1    Mar. 13, 2025

(51) Int. Cl.
G01R 11/04 (2006.01)
H01R 25/16 (2006.01)
H02B 1/03 (2006.01)
H01R 4/34 (2006.01)

(52) U.S. Cl.
CPC .............. *G01R 11/04* (2013.01); *H02B 1/03* (2013.01); *H01R 4/34* (2013.01); *H01R 25/161* (2013.01)

(58) Field of Classification Search
CPC ........ H02B 1/03; G01R 11/04; G01R 25/161; G01R 25/162
See application file for complete search history.

(56) References Cited

U.S. PATENT DOCUMENTS

| | | | | |
|---|---|---|---|---|
| 5,936,834 A * | 8/1999 | Polston | ............... | H02B 1/20 361/671 |
| 5,951,324 A * | 9/1999 | Campbell | ............... | G01R 11/04 361/662 |
| 5,980,311 A * | 11/1999 | Campbell | ............ | H01R 33/945 361/668 |
| 5,982,611 A * | 11/1999 | Campbell | ................ | H02B 1/03 174/70 B |
| 6,012,937 A * | 1/2000 | Campbell | ................ | H02B 1/20 439/212 |
| 7,239,502 B1 * | 7/2007 | Seff | ...................... | H01R 25/168 361/624 |
| 7,400,495 B1 * | 7/2008 | Ranta | ..................... | G01R 11/24 361/660 |
| 7,796,375 B2 * | 9/2010 | Zhang | ..................... | H02B 1/03 361/671 |
| 7,837,498 B2 * | 11/2010 | Zhang | ..................... | H02B 1/03 439/517 |
| 8,223,476 B2 * | 7/2012 | Zhang | ..................... | H02B 1/20 361/671 |
| 8,243,423 B2 * | 8/2012 | Ranta | ..................... | G01R 11/04 361/663 |
| 11,139,641 B1 * | 10/2021 | Gehlbach | ................. | H02B 1/03 |

* cited by examiner

*Primary Examiner* — Robert J Hoffberg
(74) *Attorney, Agent, or Firm* — Leydig, Voit & Mayer, Ltd.

(57) ABSTRACT

A strap for an electrical system, an electrical system with balanced phases, and a method for balancing phases of an electrical system are provided. The strap includes an elongated body having: a first end, the first end includes a hole, and the first end is configured for connection to a meter socket of the electrical system by a first fastener through the hole; and a second end, the second end includes a first slot with an opening and a second slot with an opening, and the opening of the first slot is opposite to the opening of the second slot, and the second end is configured for connection to a first upstream busbar of the electrical system by a second fastener through the first slot, or the second end is configured for connection to a second upstream busbar of the electrical system by a third fastener through the second slot.

13 Claims, 22 Drawing Sheets

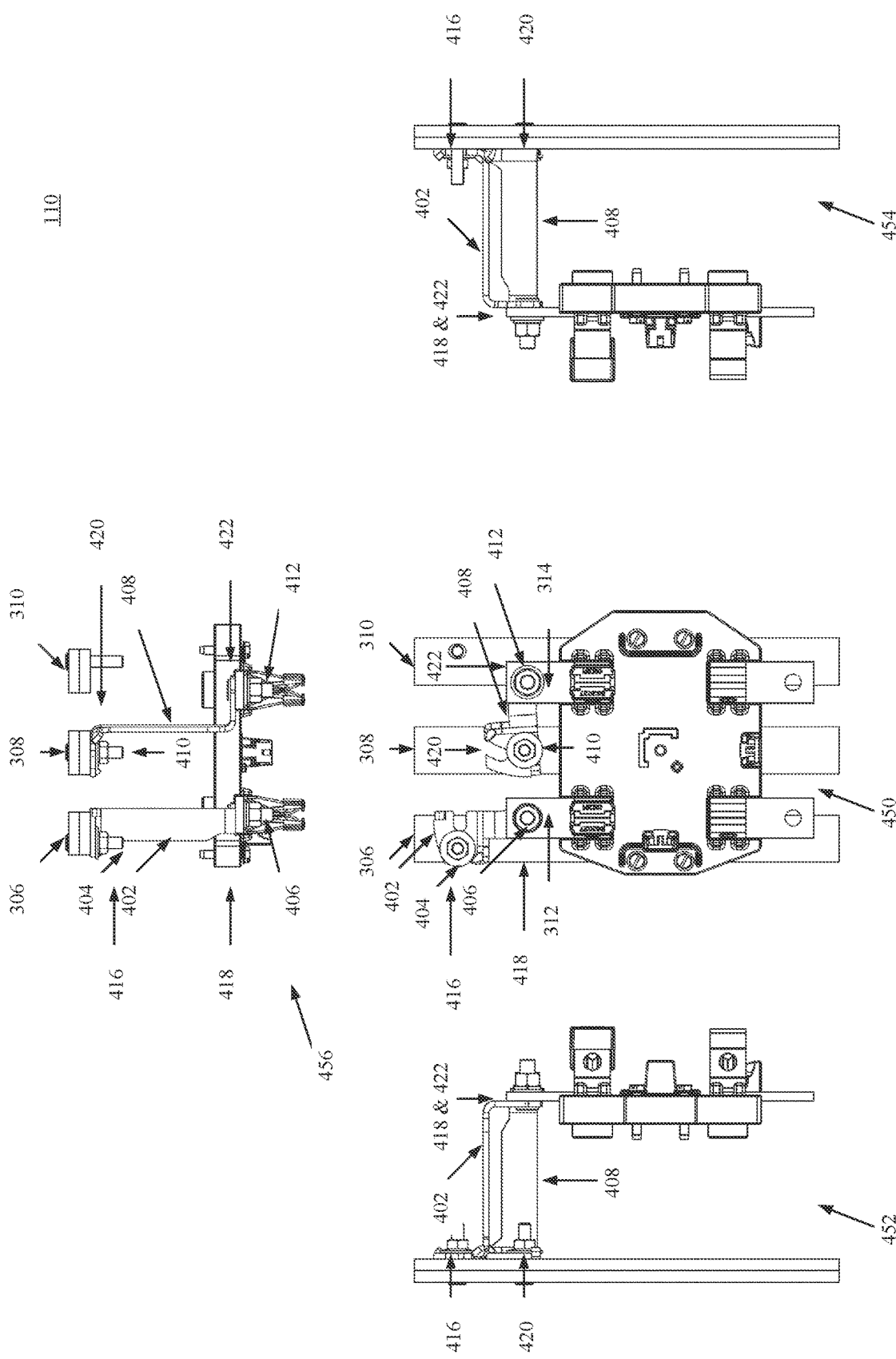

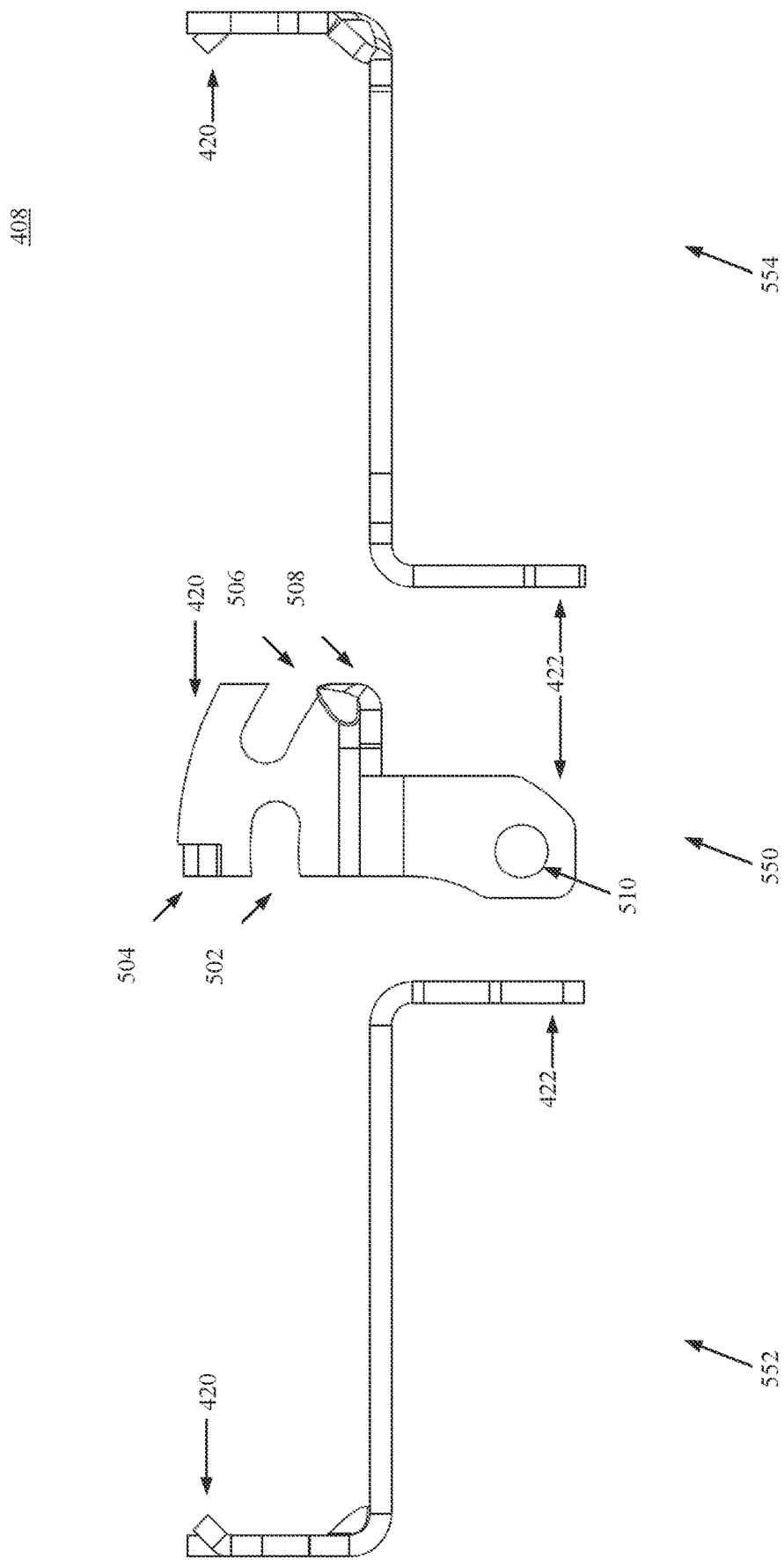

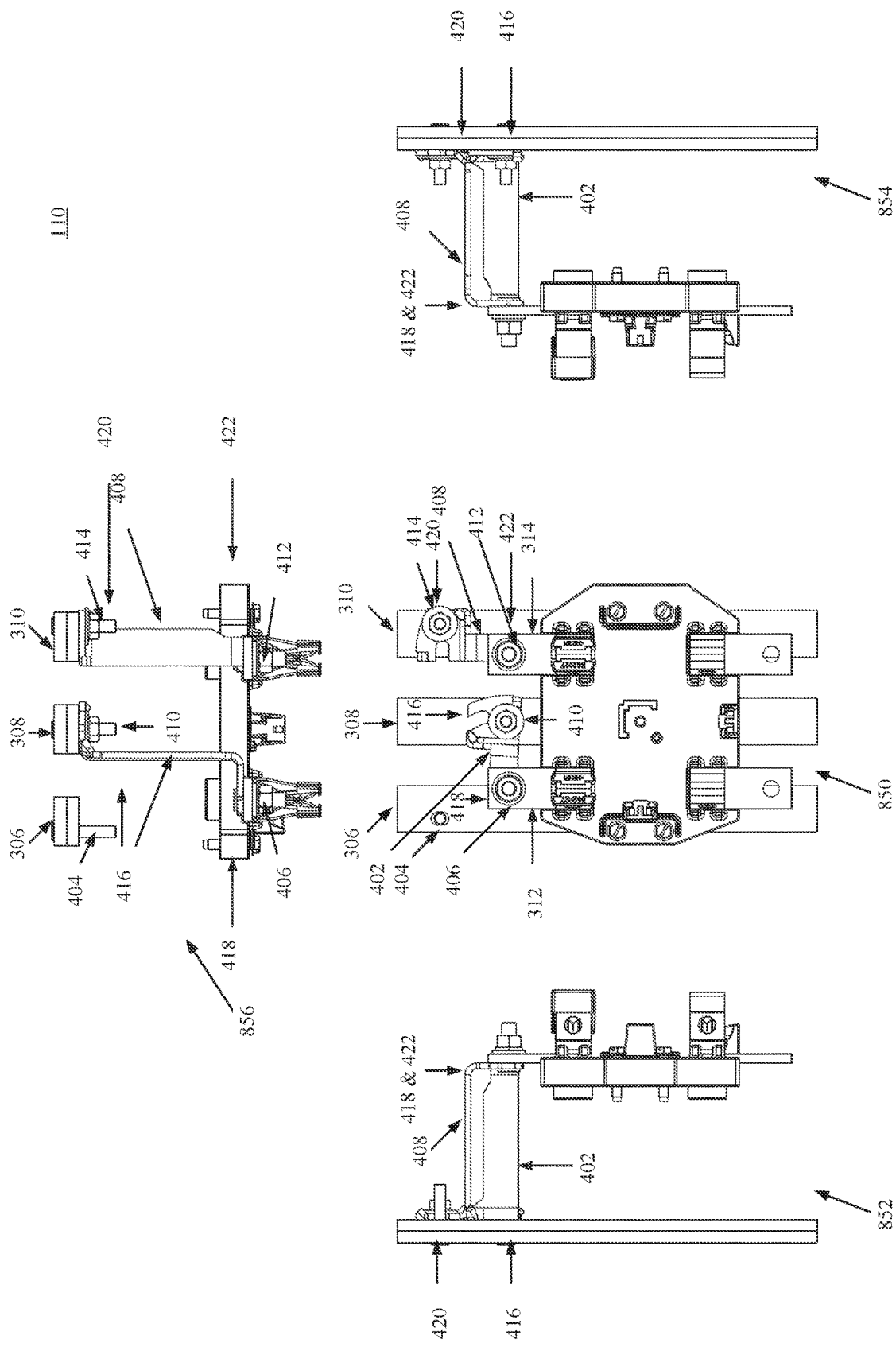

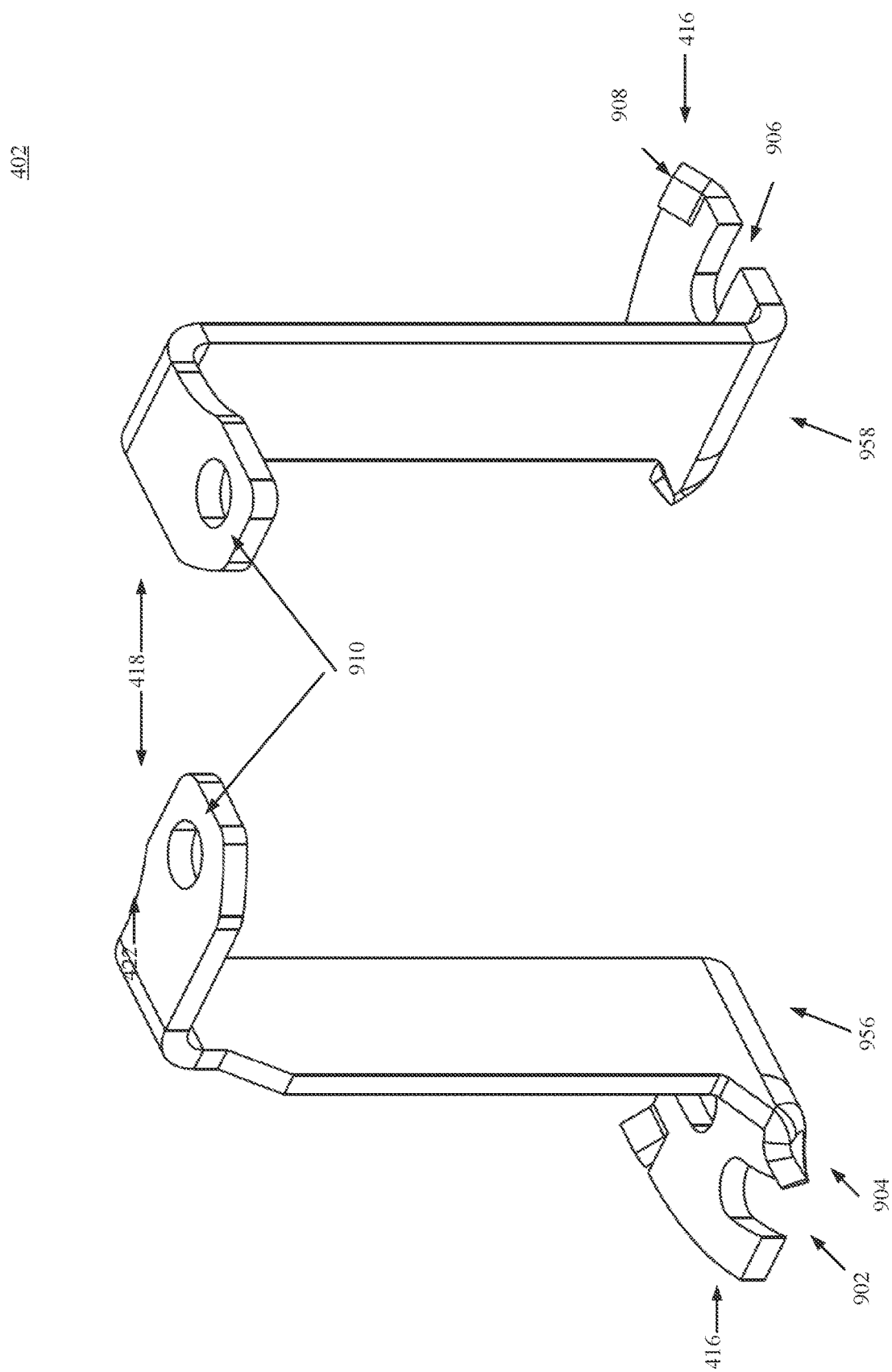

PHASE BALANCING STRAP FOR ELECTRICAL SYSTEMS

FIELD

The present disclosure generally relates to a phase balancing strap, and more particularly, to a phase balancing strap for an electrical system and a method for balancing phases of an electrical system.

BACKGROUND

A meter stack is widely used, for example, for residential buildings. Generally, a meter stack is connected to multiple metering enclosures, and all meter sockets within each metering enclosure are connected to the same phase. However, it is desired that a one phase meter socket should be phase balanced when it is connected to a three-phase electric power source. In order to achieve a phase-balanced meter stack, a corresponding factory setting needs to be revised. Connecting straps between a meter socket and three-phase lines usually need to be moved. For example, the connecting straps need to be first loosened, hardware needs to be removed, the connecting straps need to be repositioned, and then reconnected. This causes additional work and extra time for making an electrical system phase-balanced. This also causes possible failures during the process, which include dropping hardware, wrong repositioning and/or reconnecting the connecting straps.

Therefore, there is a need to more easily balance phases of an entire meter stack. At the same time, there is a need for a more versatile design of a meter stack, which allows more versatility.

SUMMARY

In an exemplary embodiment, the present disclosure provides a strap for an electrical system that includes:

An elongated body, the elongated body having: a first end, wherein the first end includes a hole, and the first end is configured for connection to a meter socket of the electrical system by a first fastener through the hole; and a second end, wherein the second end includes a first slot with an opening and a second slot with an opening, and the opening of the first slot is opposite to the opening of the second slot, and wherein the second end is configured for connection to a first upstream busbar of the electrical system by a second fastener through the first slot, or the second end is configured for connection to a second upstream busbar of the electrical system by a third fastener through the second slot.

The hole of the first end of the elongated body is round and the first fastener is a bolt.

A press-fit screw or a press-fit stud is installed in the hole of the first end of the elongated body.

A raised element is located on a side of the opening of each of the first slot and the second slot. First securing hardware is located next to the raised element on the side of the opening of the first slot while the second end of the elongated body is connected to the first upstream busbar of the electrical system by the second fastener through the first slot, and second securing hardware is located next to the raised element on the side of the opening of the second slot while the second end of the elongated body is connected to the second upstream busbar of the electrical system by the third fastener through the second slot. The first and second securing hardware include at least one of nutwasher and lockwasher.

The second fastener and the third fastener are studs.

In an exemplary embodiment, the present disclosure provides an electrical system that includes:

A three-phase electric power source; a meter socket; and a strap, wherein the strap includes: a first end, wherein the first end includes a hole, and the first end is configured for connection to the meter socket by a first fastener through the hole; and a second end, wherein the second end includes a first slot with an opening and a second slot with an opening, and the opening of the first slot is opposite to the opening of the second slot, and wherein the second end is configured for connection to a first upstream busbar of the three-phase electric power source by a second fastener through the first slot, or the second end is configured for connection to a second upstream busbar of the three-phase electric power source by a third fastener through the second slot.

The hole of the first end of the strap is round and the first fastener is a bolt.

A press-fit screw or a press-fit stud is installed in the hole of the first end of the strap.

A raised element is located on a side of the opening of each of the first slot and the second slot. First securing hardware is located next to the raised element on the side of the opening of the first slot while the second end of the strap is connected to the first upstream busbar of the electrical system by the second fastener through the first slot, and second securing hardware is located next to the raised element on the side of the opening of the second slot while the second end of the strap is connected to the second upstream busbar of the electrical system by the third fastener through the second slot. The first and second securing hardware include at least one of nutwasher and lockwasher.

In an exemplary embodiment, the present disclosure further provides a method of balancing phases of an electrical system, wherein a meter socket of the electrical system is connected to a first end of a strap by a first fastener through a hole of the first end of the strap. The method includes:

Loosening a second fastener, by which a first upstream busbar of the electrical system is connected to a second end of the strap through a first slot of the second end of the strap; and rotating the strap around an axis of the hole of the first end of the strap to a position of a second upstream busbar of the electrical system, and connecting the second end of the strap to the second upstream busbar of the electrical system by a third fastener through a second slot of the second end of the strap, and wherein each of the first slot and the second slot of the second end of the strap has an opening that is opposite to the other.

The third fastener is located on the position of the second upstream busbar of the electrical system and the third fastener is a stud, and wherein the rotating the strap to the position of the second upstream busbar of the electrical system includes: entering the stud into the opening of the second slot of the second end of the strap.

A press-fit screw or a press-fit stud is installed in the hole of the first end of the strap.

A raised element is located on a side of the opening of each of the first slot and the second slot. First securing hardware is located next to the raised element on the side of the opening of the first slot while the second end of the strap is connected to the first upstream busbar of the electrical system by the second fastener through the first slot, and second securing hardware is located next to the raised element on the side of the opening of the second slot while the second end of the strap is connected to the second upstream busbar of the electrical system by the third fastener through the second slot. The method further includes: securing the second fastener in the first slot of the second end of the strap to the first upstream busbar of the electrical system through the first securing hardware; and securing the third fastener in the second slot of the second end of the strap to the second upstream busbar of the electrical system through the second securing hardware. The first and second securing hardware include at least one of nutwasher and lockwasher.

BRIEF DESCRIPTION OF THE DRAWING(S)

Figure 2A:
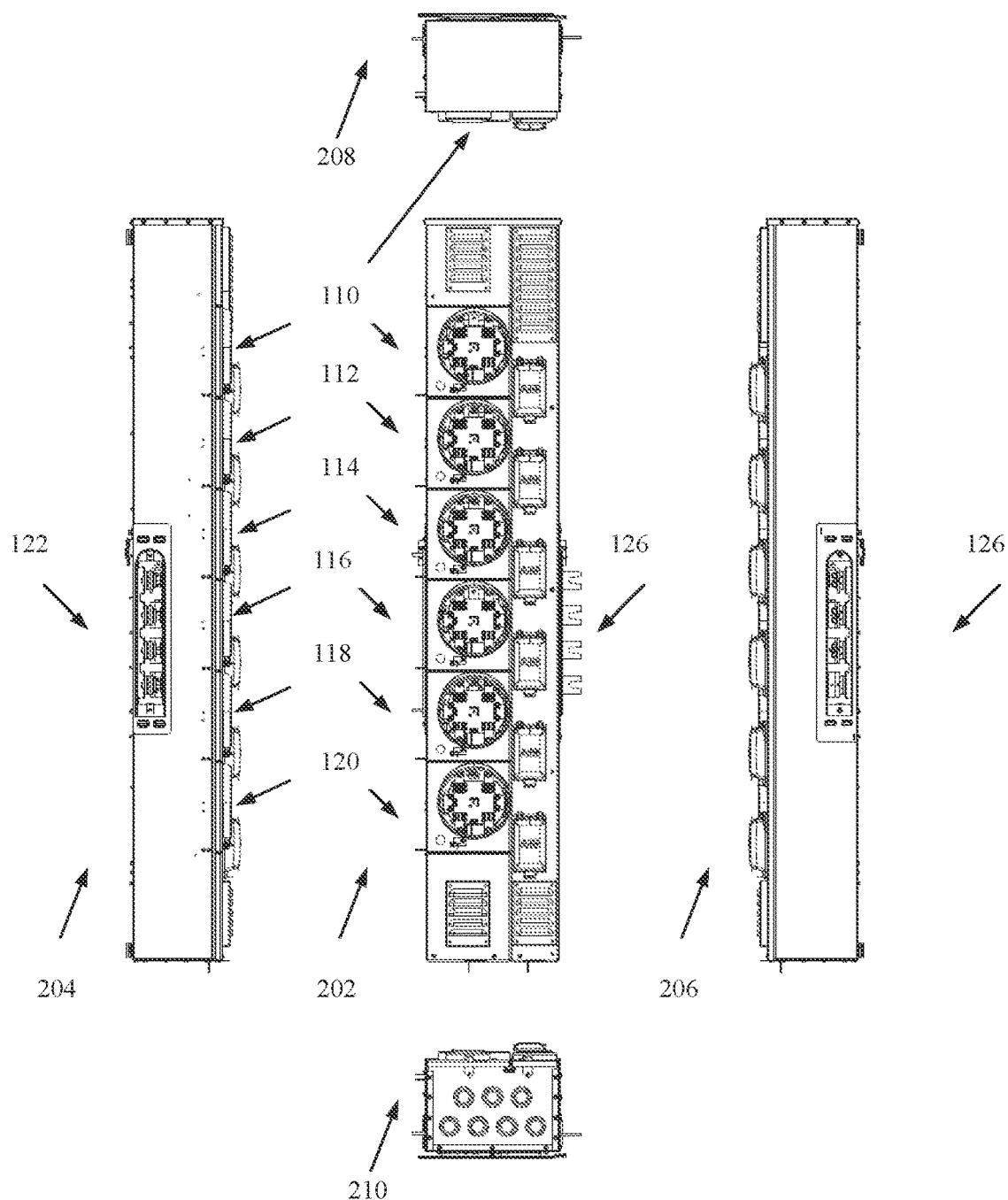
Figure 2B:
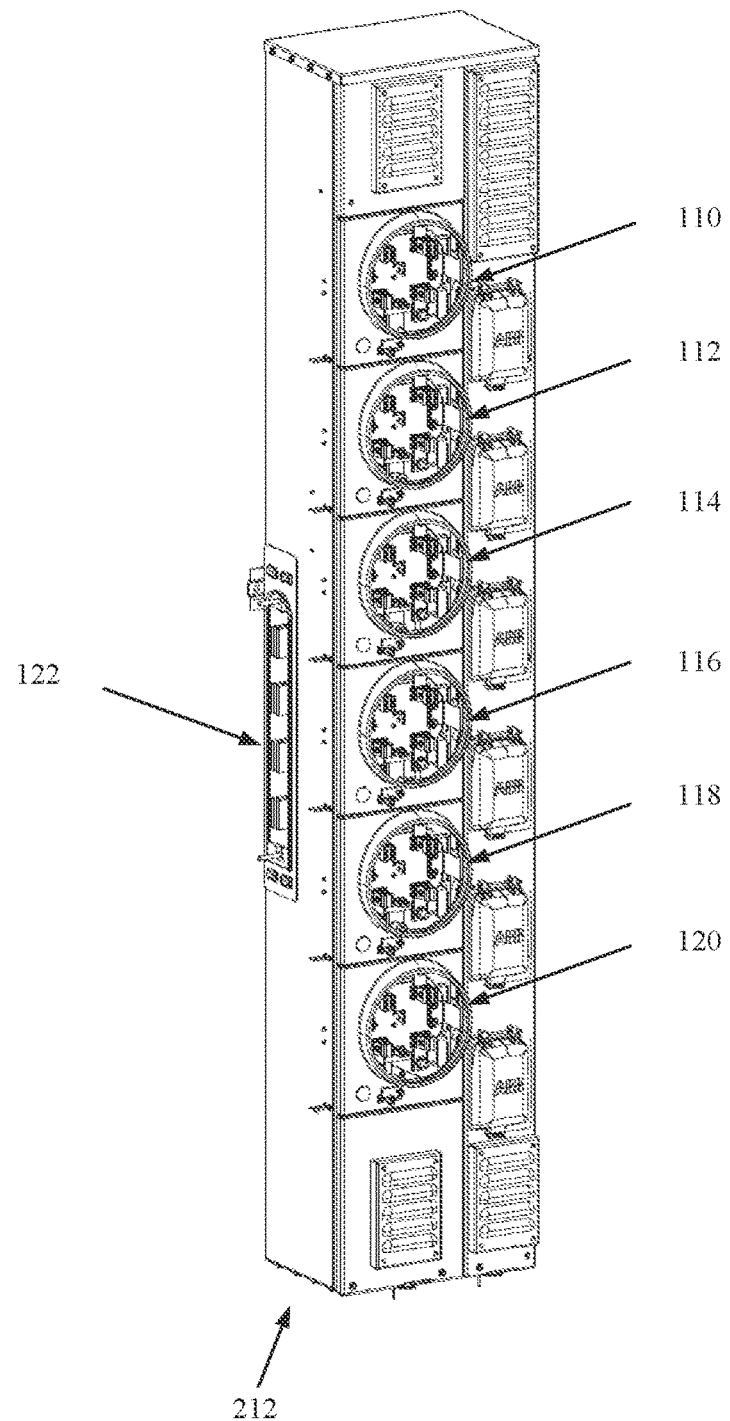
Figure 2C:
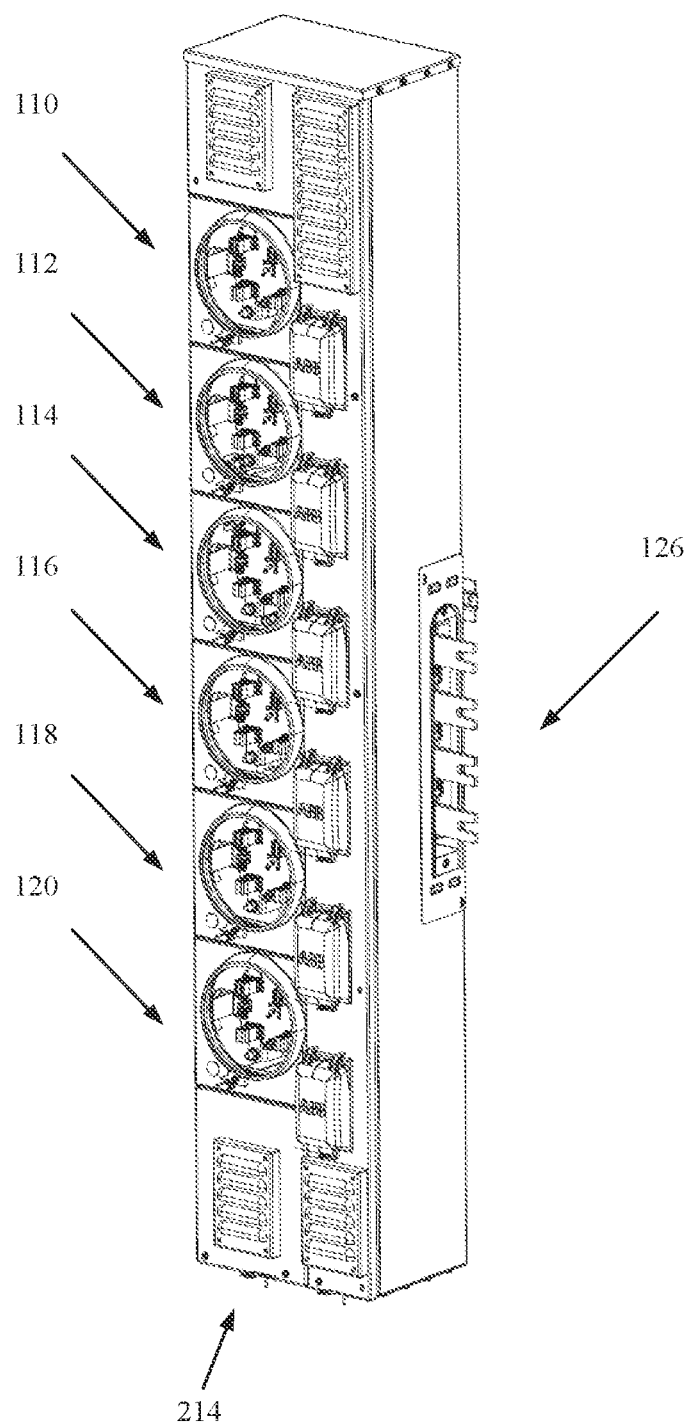
Figure 3A:
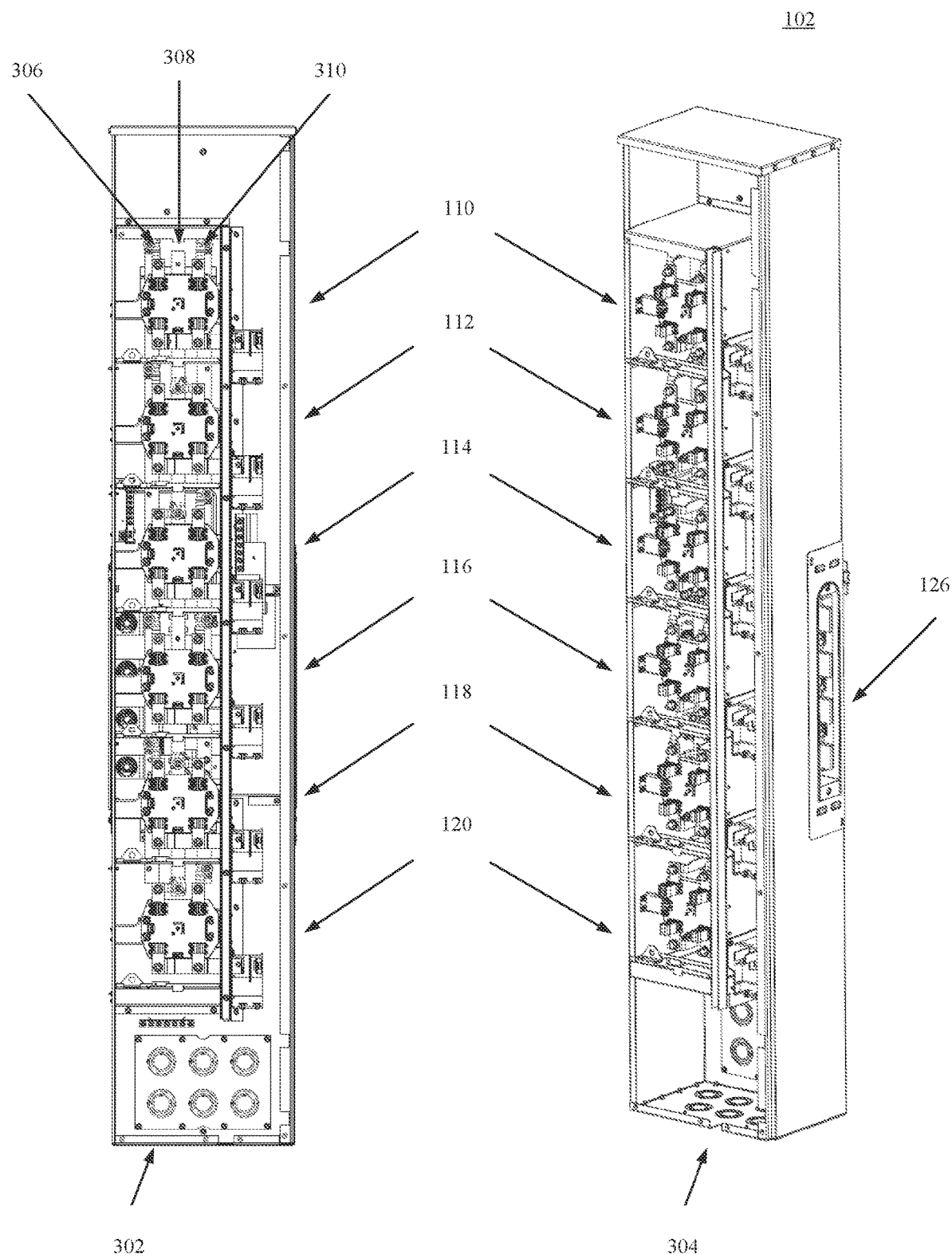
Figure 3B:
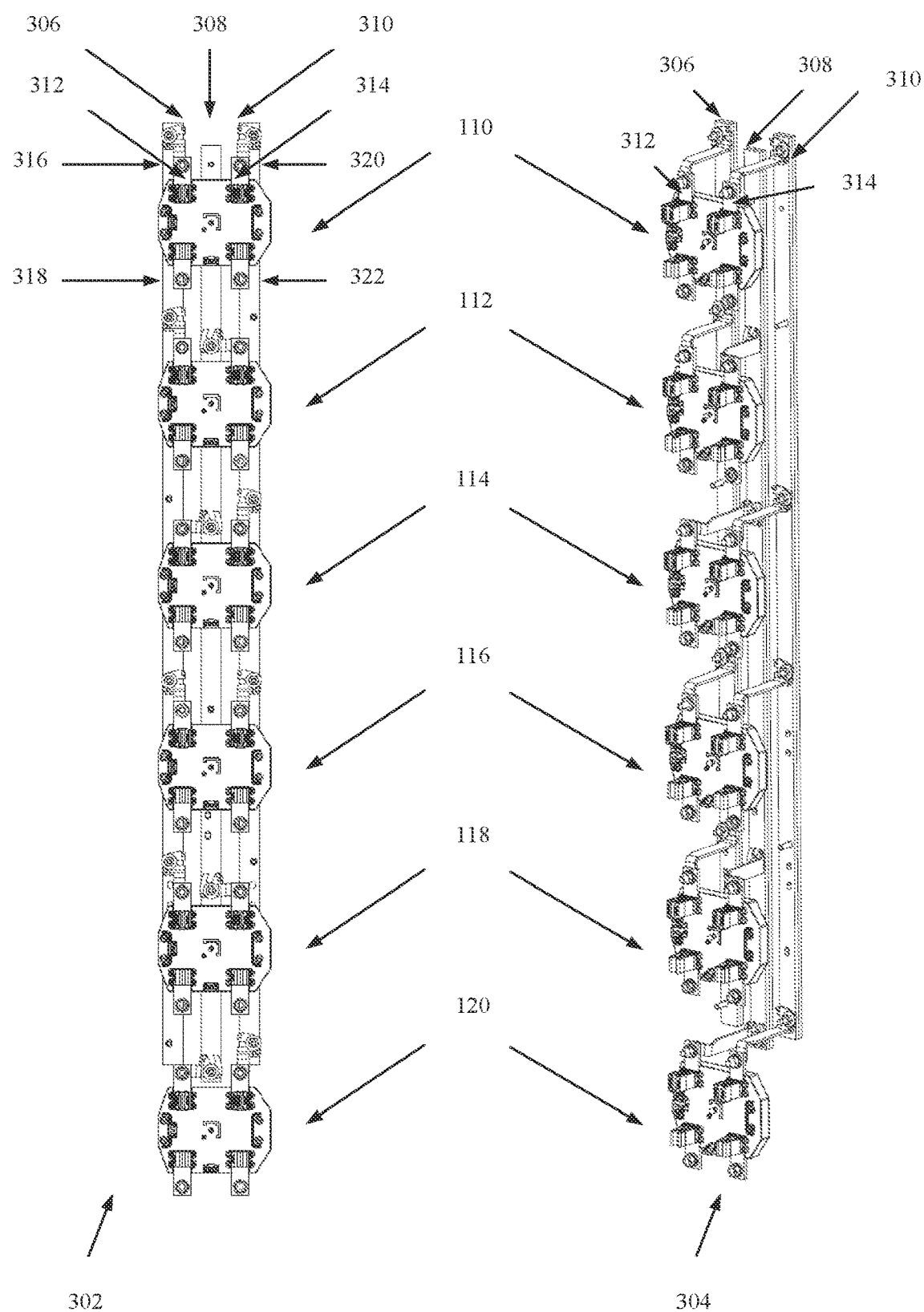
Figure 4B:
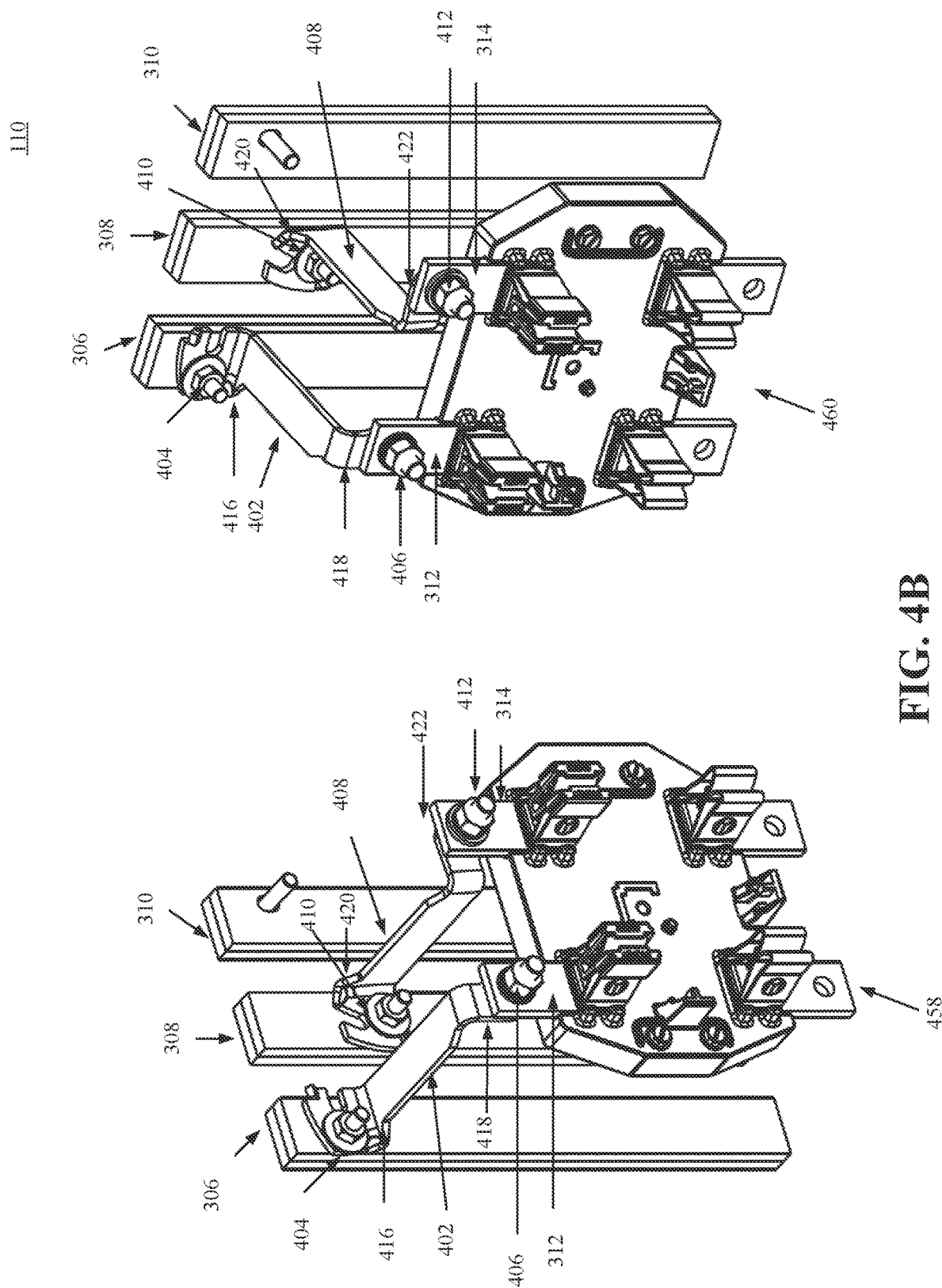
Figure 5B:
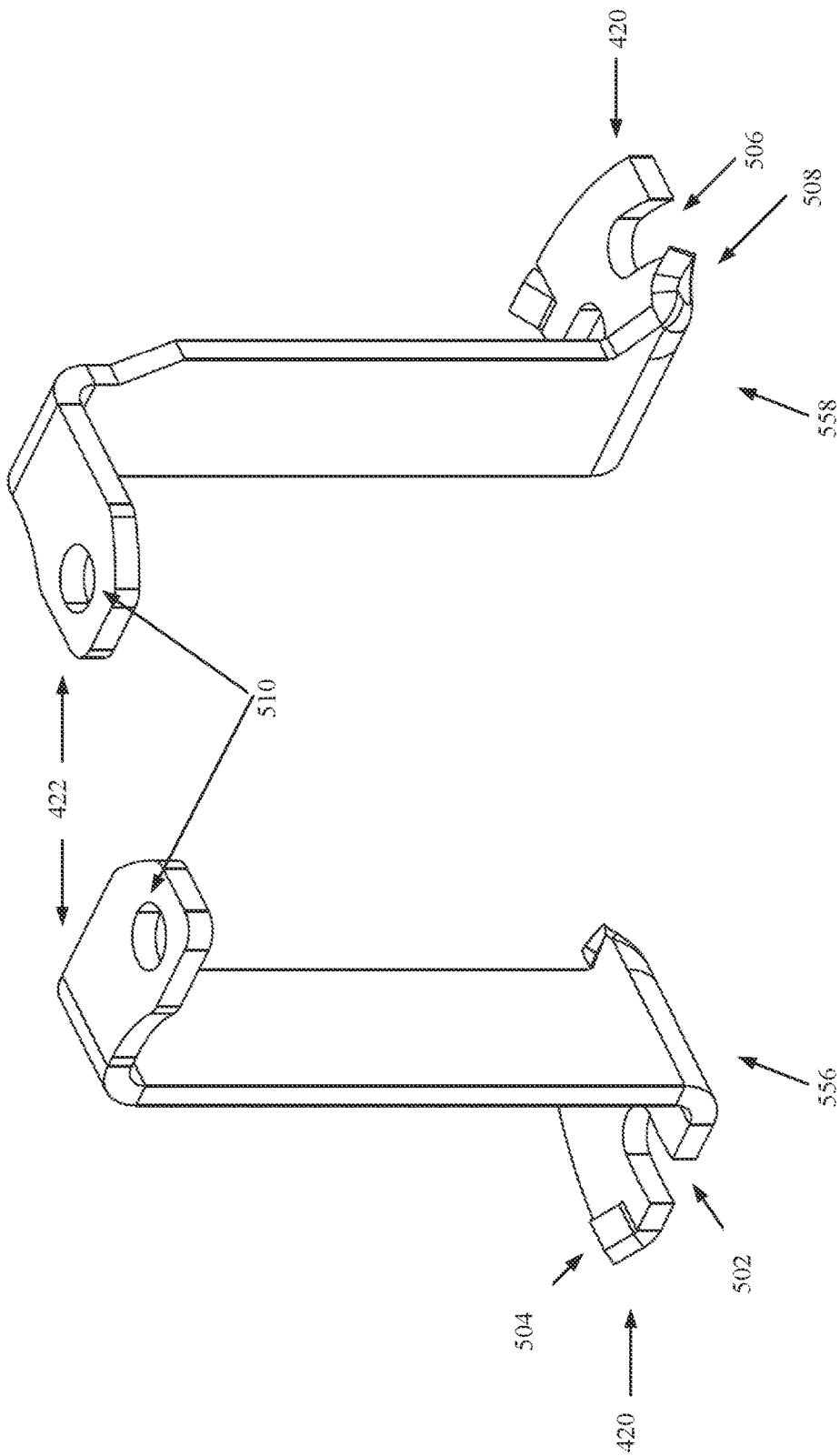
Figure 6A:
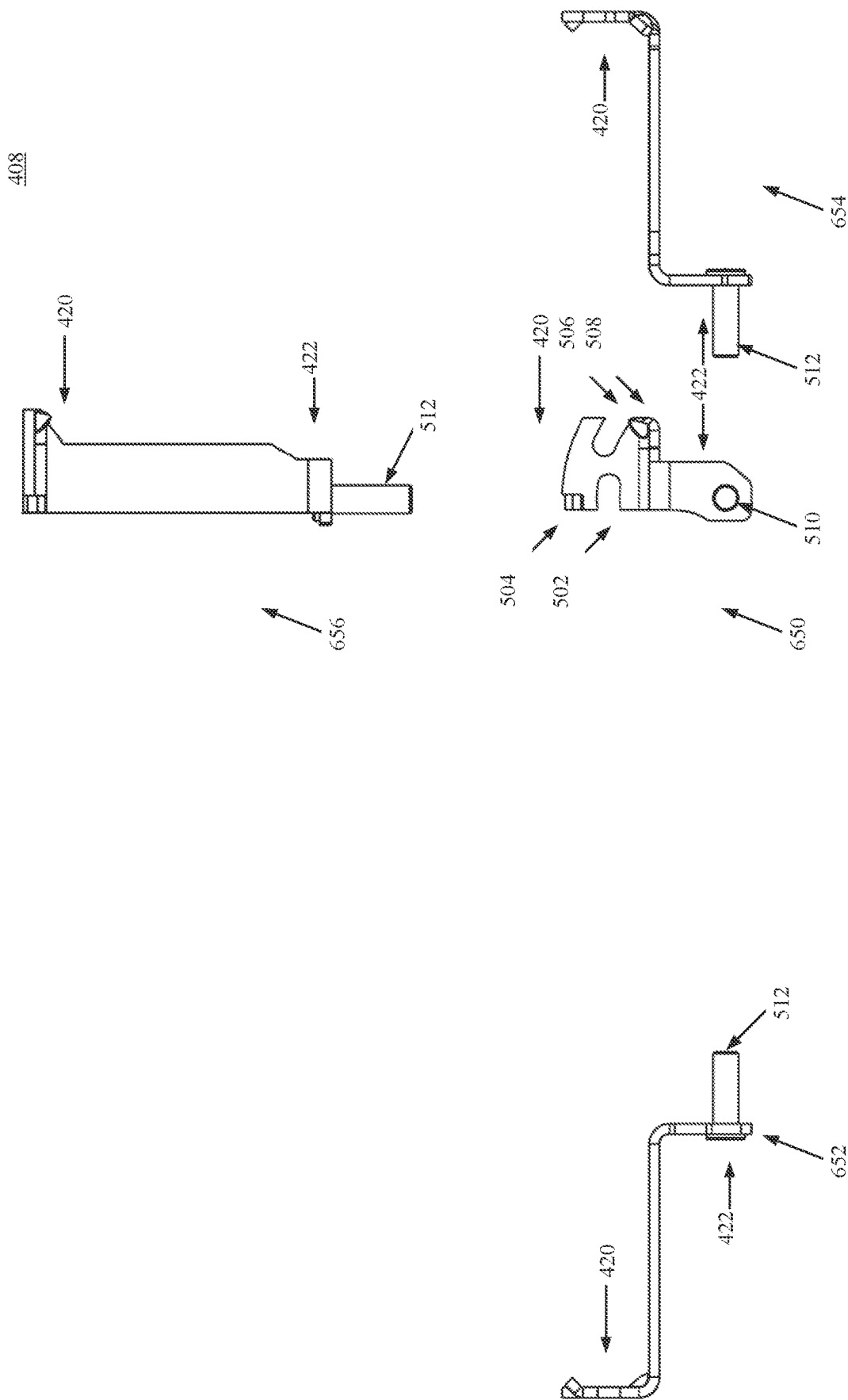
Figure 6B:
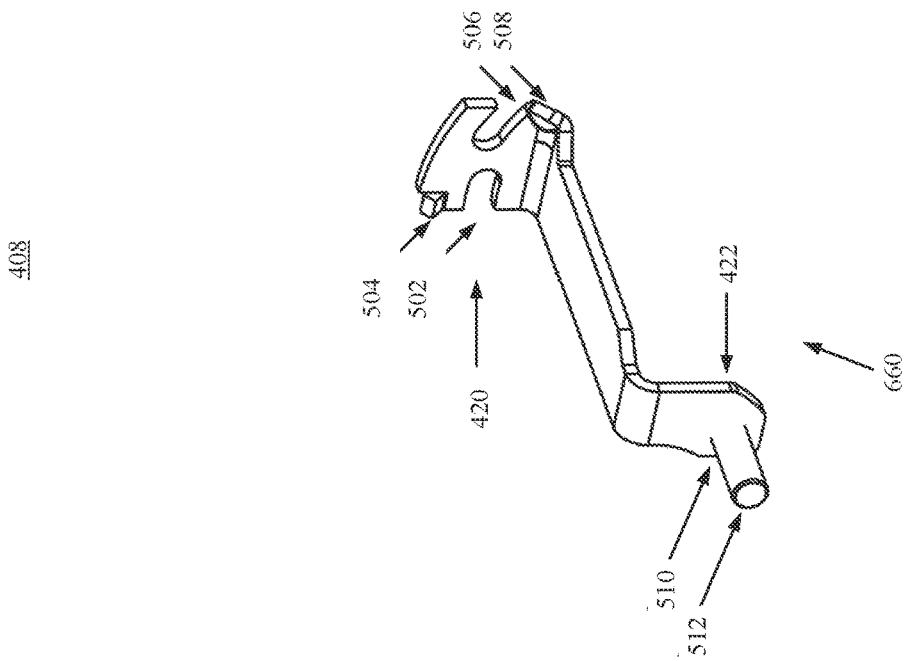
Figure 6B:
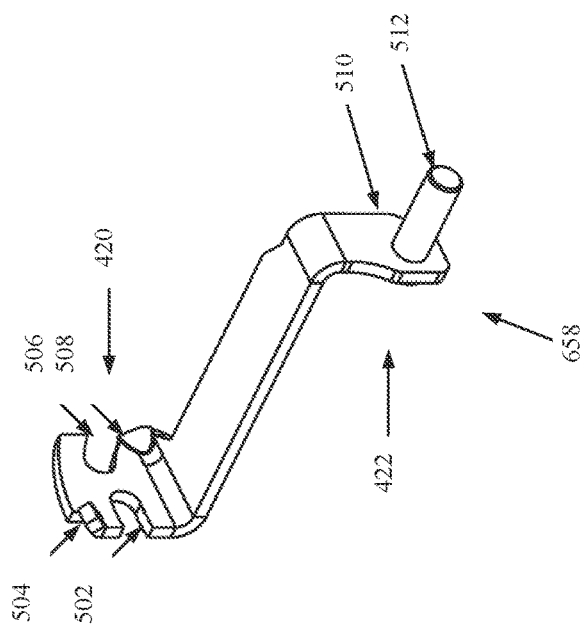
Figure 7A:
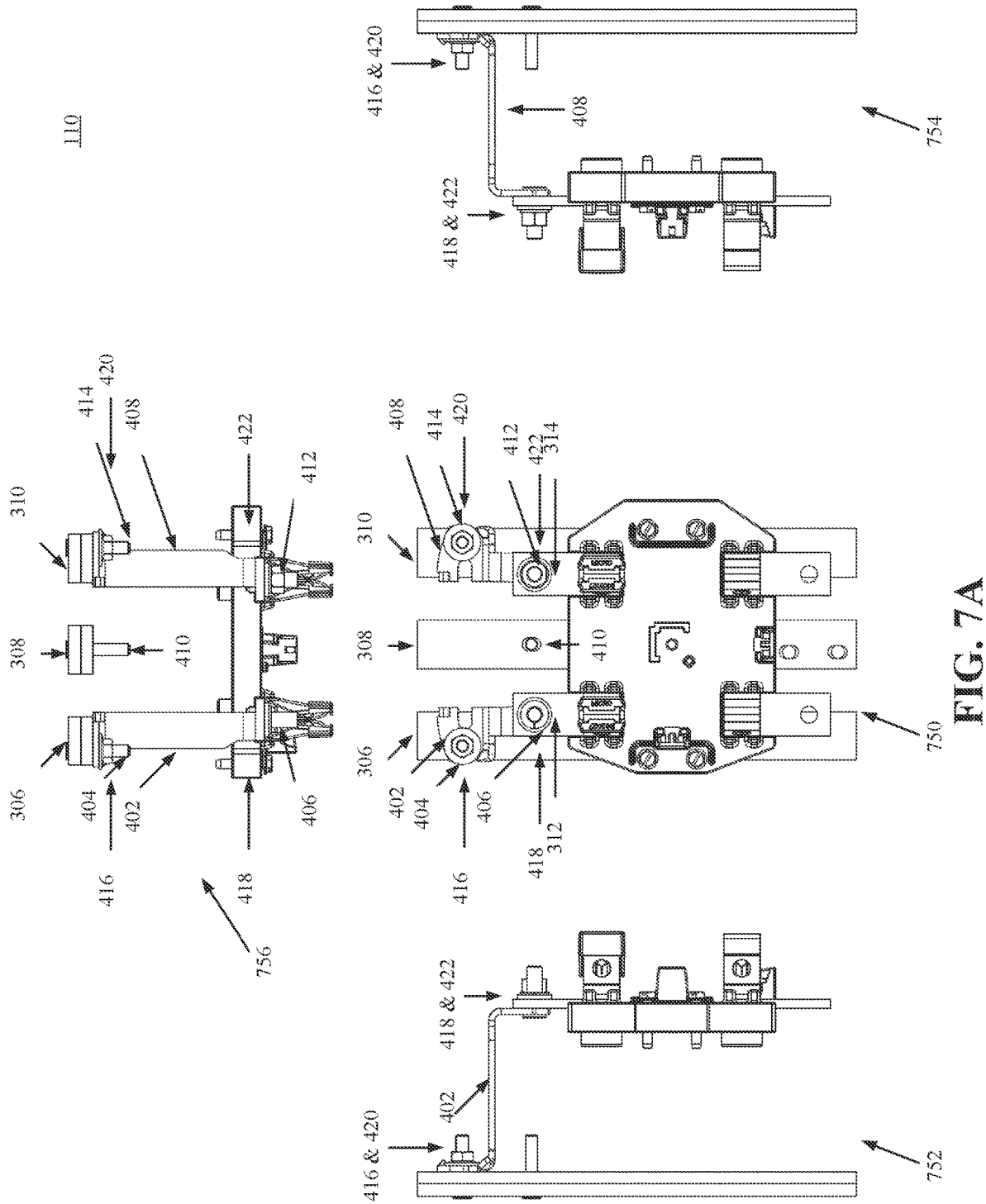
Figure 7B:
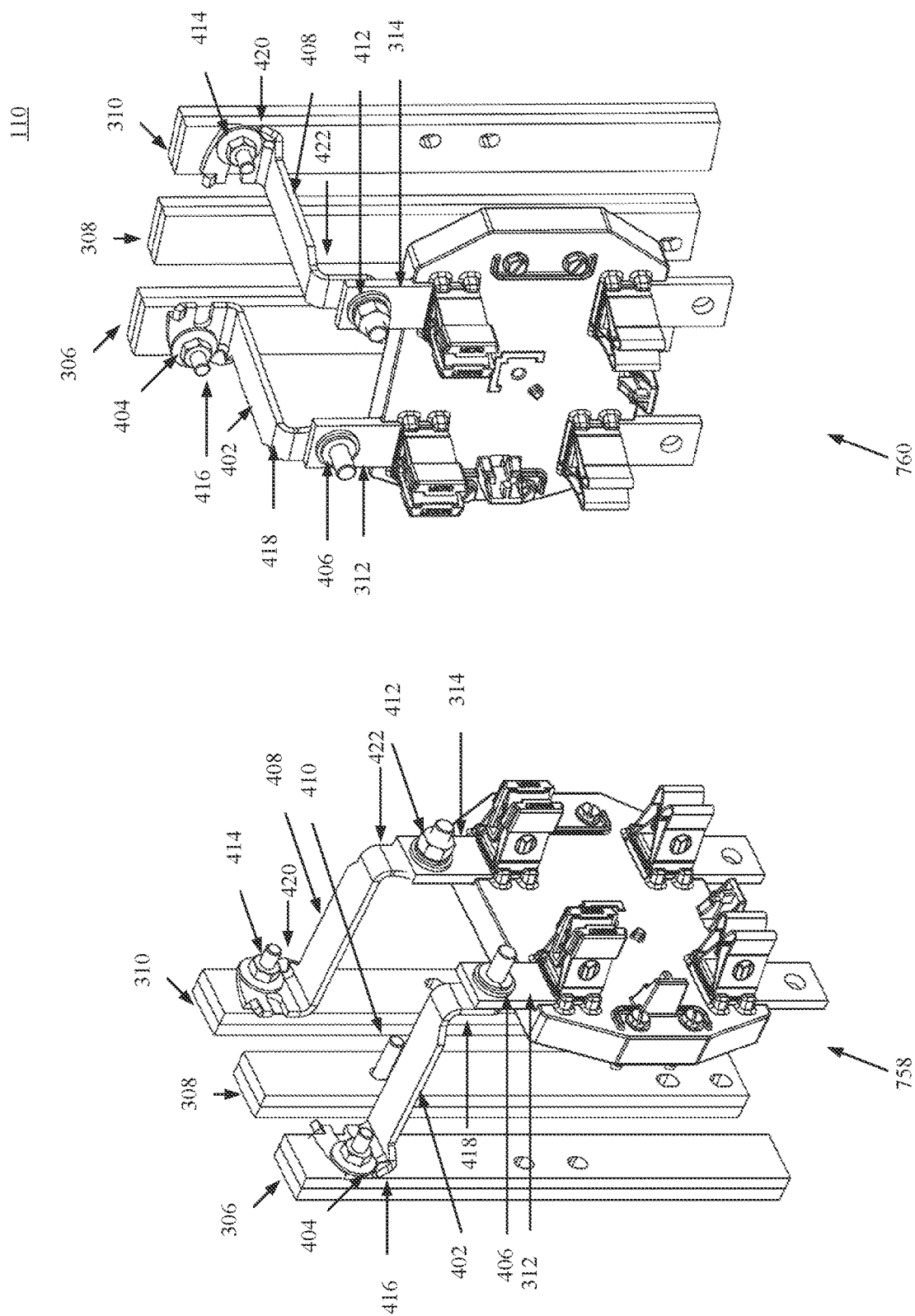
Figure 8B:
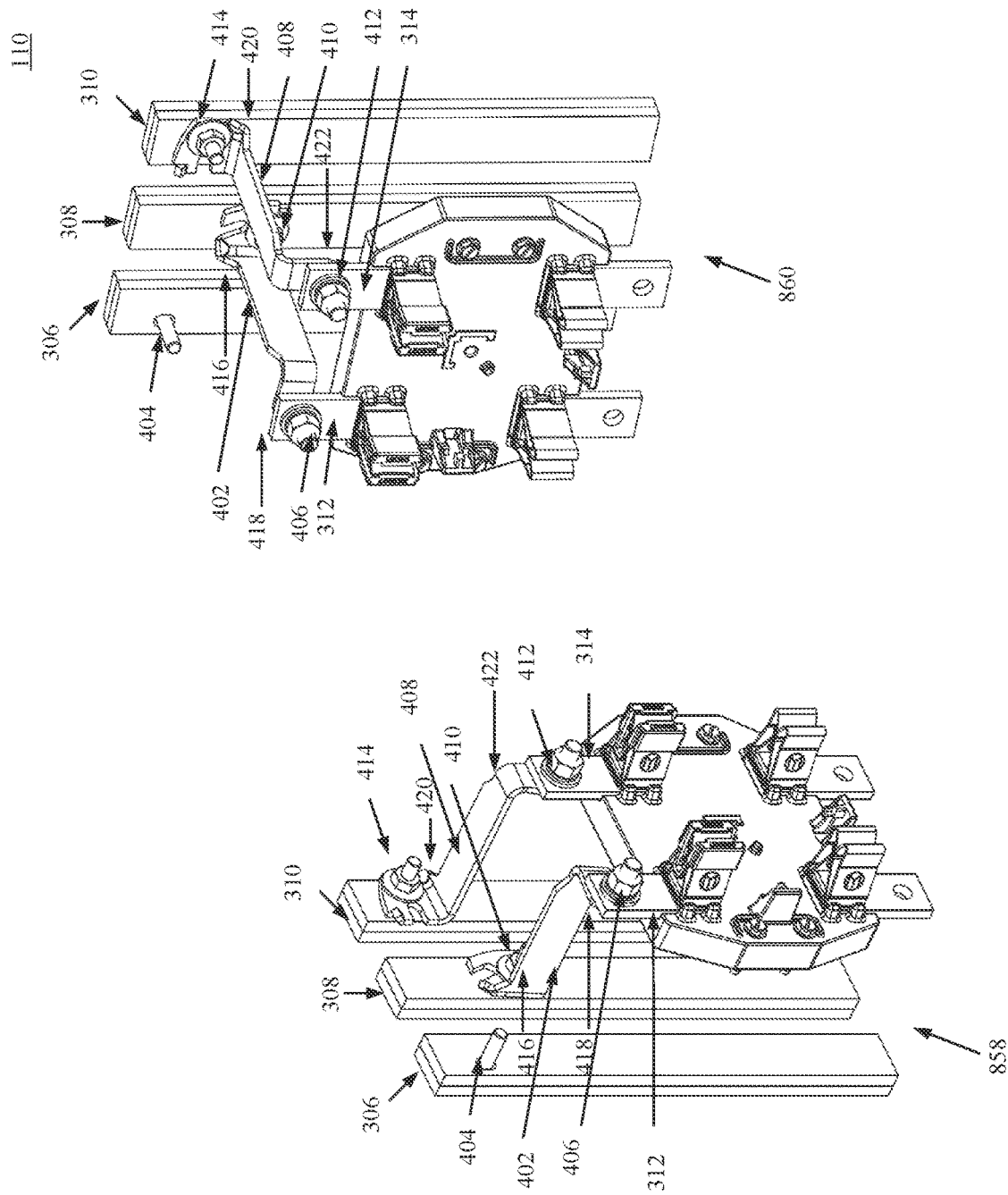
Figure 9A:
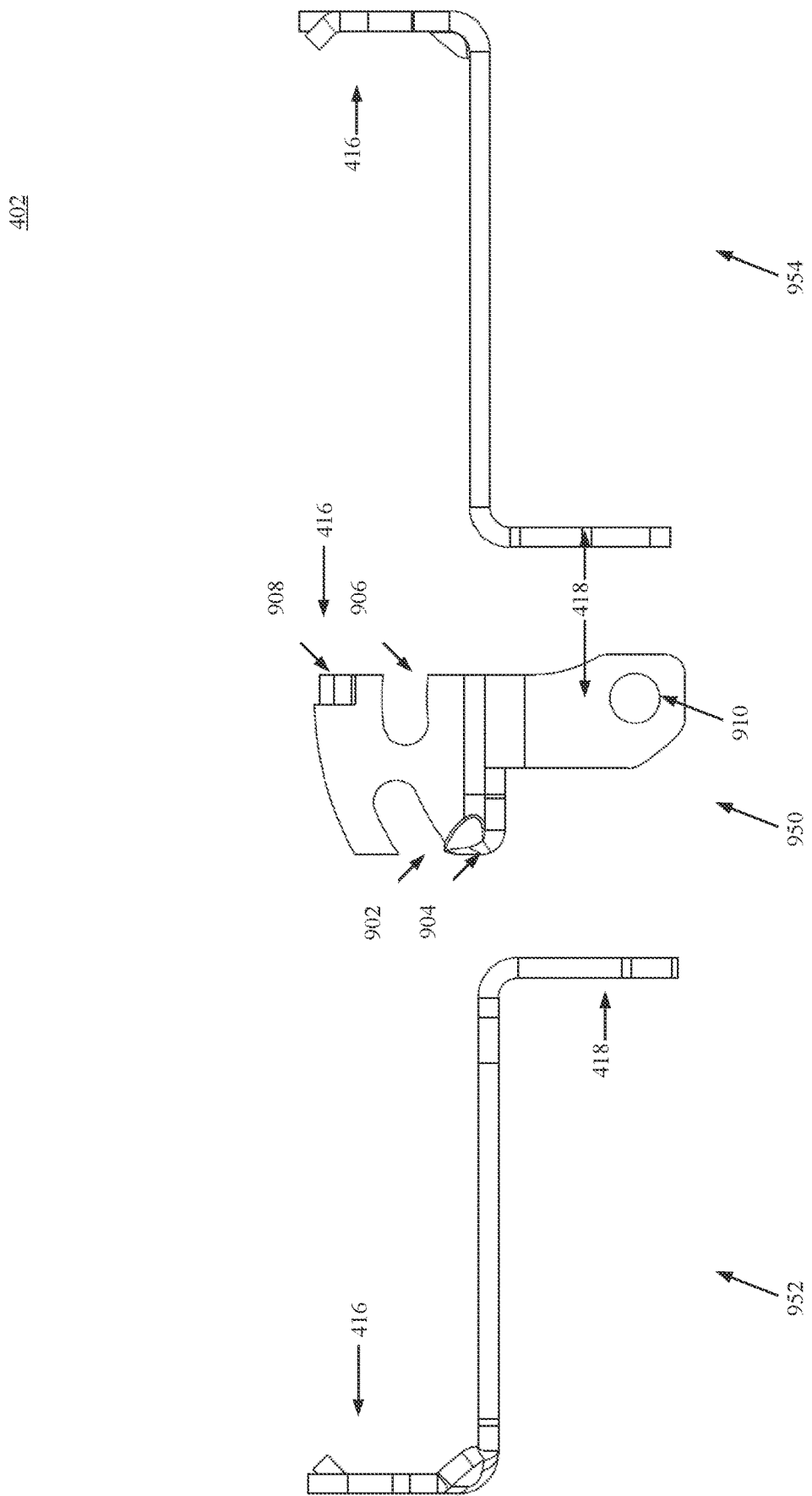
Figure 10A:
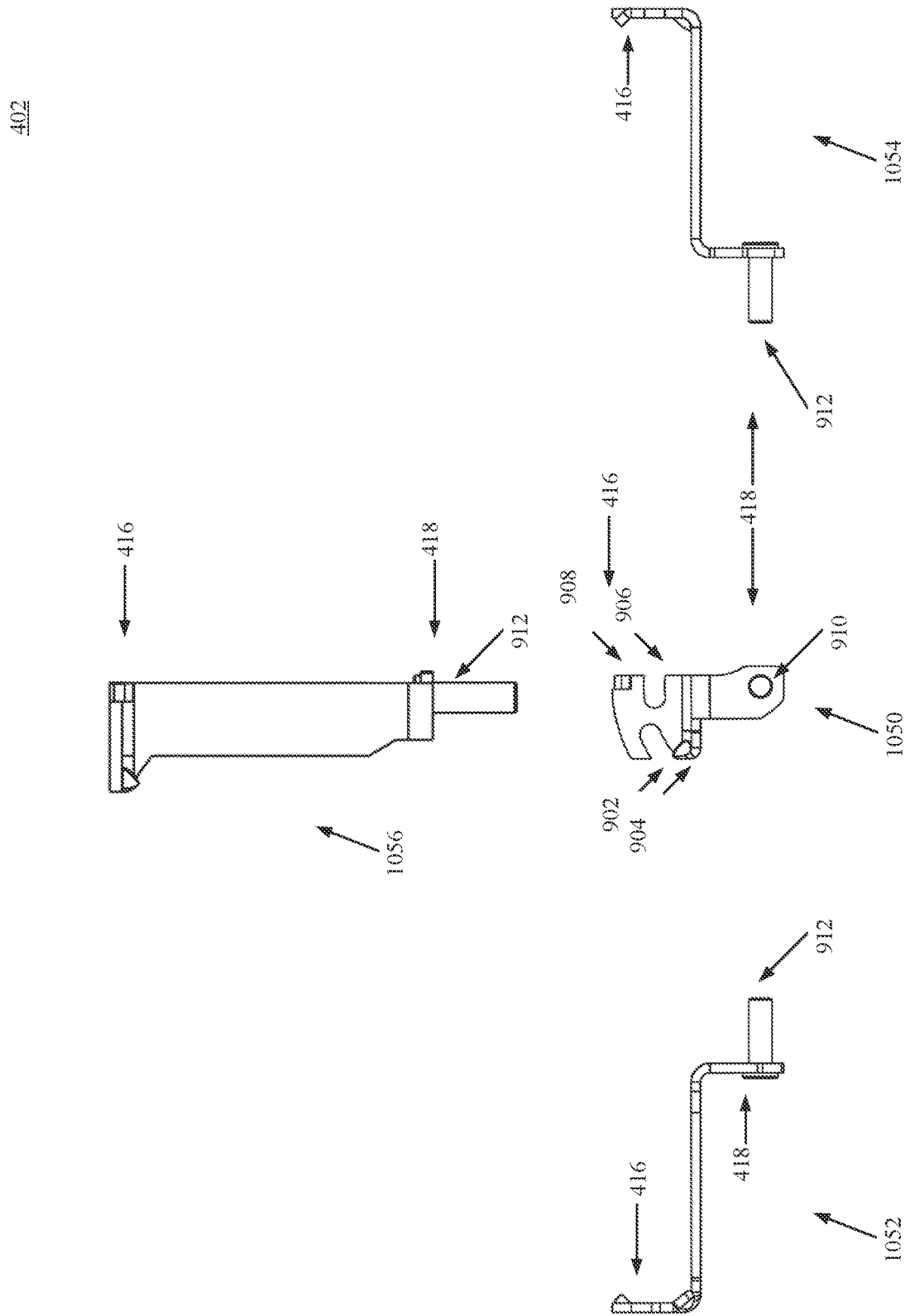
Figure 10B:
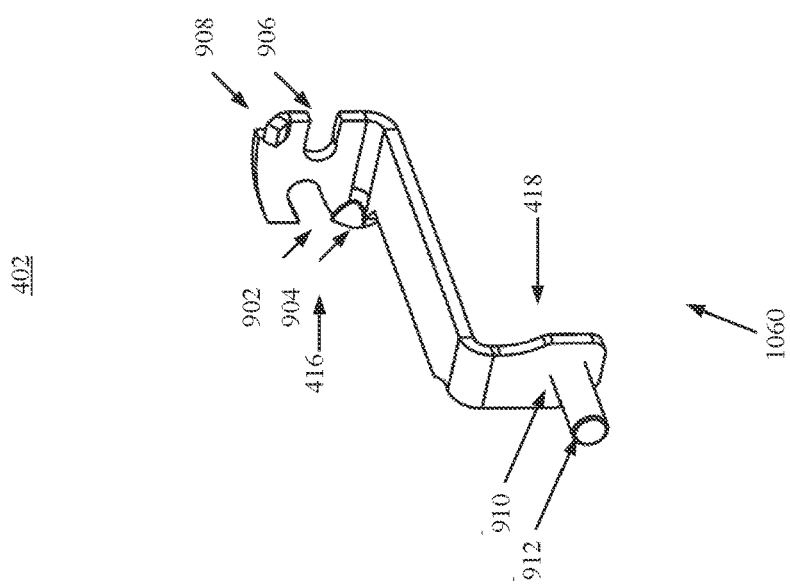
Figure 10B:
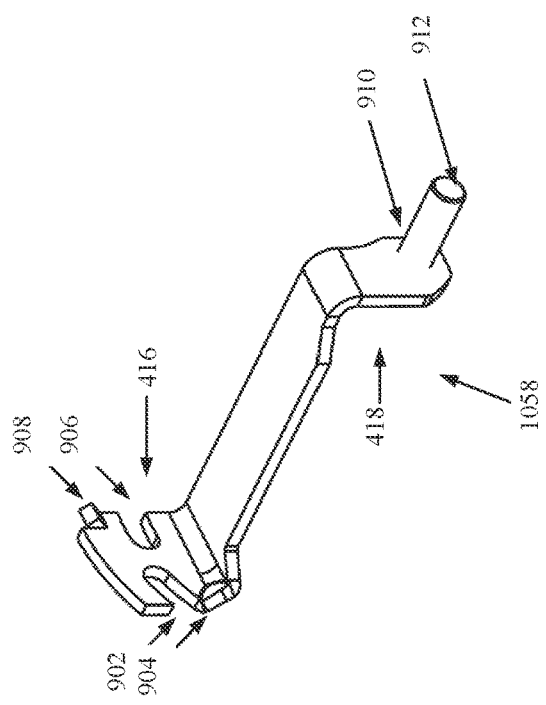

FIG. 2A includes a front view, a left side view, a right side view, a top view, and a bottom view of a metering enclosure according to an exemplary embodiment of the present disclosure;

FIG. 2B is a front perspective view of a metering enclosure according to an exemplary embodiment of the present disclosure;

FIG. 2C is another front perspective view of a metering enclosure according to an exemplary embodiment of the present disclosure;

FIG. 3A includes a front view and a front perspective view of a metering enclosure without a front cover according to an exemplary embodiment of the present disclosure;

FIG. 3B includes a front view and a front perspective view of the internal components of the metering enclosure of FIG. 3A without an enclosure according to an exemplary embodiment of the present disclosure;

FIG. 4A includes a front view, a left side view, a right side view, and a top view of a meter socket on a phase A-B connection according to an exemplary embodiment of the present disclosure;

FIG. 4B includes front perspective views of a meter socket on a phase A-B connection according to an exemplary embodiment of the present disclosure;

FIG. 5A includes a front view, a left side view, and a right side view of a phase balancing strap according to an exemplary embodiment of the present disclosure;

FIG. 5B includes bottom perspective views of a phase balancing strap according to an exemplary embodiment of the present disclosure;

FIG. 6A includes a front view, a left side view, a right side view, and a top view of a phase balancing strap according to an exemplary embodiment of the present disclosure;

FIG. 6B includes front perspective views of a phase balancing strap according to an exemplary embodiment of the present disclosure;

FIG. 7A includes a front view, a left side view, a right side view, and a top view of a meter socket on a phase A-C connection according to an exemplary embodiment of the present disclosure;

FIG. 7B includes front perspective views of a meter socket on a phase A-C connection according to an exemplary embodiment of the present disclosure;

FIG. 8A includes a front view, a left side view, a right side view, and a top view of a meter socket on a phase B-C connection according to an exemplary embodiment of the present disclosure;

FIG. 8B includes front perspective views of a meter socket on a phase B-C connection according to an exemplary embodiment of the present disclosure;

FIG. 9A includes a front view, a left side view, and a right side view of a phase balancing strap according to an exemplary embodiment of the present disclosure;

FIG. 9B includes bottom perspective views of a phase balancing strap according to an exemplary embodiment of the present disclosure;

FIG. 10A includes a front view, a left side view, a right side view, and a top view of a phase balancing strap according to an exemplary embodiment of the present disclosure; and FIG. 10B includes front perspective views of a phase balancing strap according to an exemplary embodiment of the present disclosure.

DETAILED DESCRIPTION

Exemplary embodiments of the present disclosure provide a strap for an electrical system, an electrical system with balanced phases, and a method for balancing phases of an electrical system.

A meter stack, which is connected to multiple metering enclosures, also known as meter modules, is widely applied for civil uses, such as various residential buildings. Within each of the multiple metering enclosures, all meter sockets are usually connected to the same phase. It is, however, desirable that each individual meter socket within each of the multiple metering enclosures is phase balanced when it is, for example, connected to a three-phase electric power source.

Currently, some of the solutions to have an individual phase balanced meter socket include completely removing a phase balancing strap in order to connect a meter socket to a different set of straps, and exploiting a slide for a rotating design. Some of the solutions cannot make an individual meter socket phase balanced, but at least each meter stack is phase balanced.

In an exemplary embodiment of the present disclosure, a phase balancing strap is provided. It allows an individual meter socket to be connected to any phase, and to more easily phase balance an entire meter stack, which allows for more versatility. With the disclosed phase balancing strap, all necessary parts, for example, screws, etc. are directly accessible from the front of a meter socket/meter stack, and no parts can be dropped. Further, since no parts need to be removed and/or reinstalled in order to change a phase of a meter socket, the changing process is faster. Furthermore, the design of a raised element on a slot opening of the strap ensures that the strap is properly positioned, and also, prevents any unintended rotation of the strap and/or any unexpected dislodgment of the strap in the event that the securing hardware for the strap becomes loose.

Figure 1A:
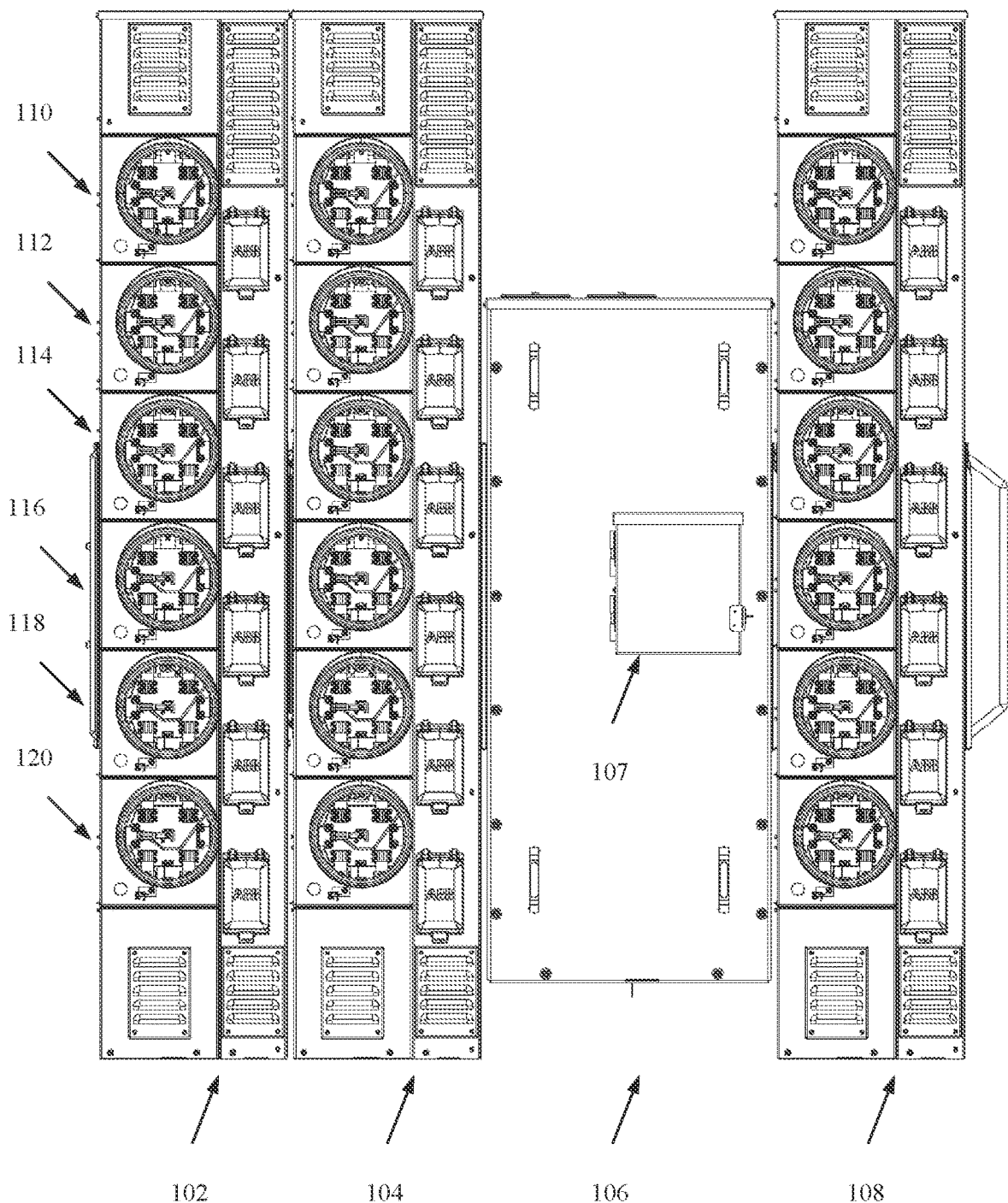
FIG. 1A is a front view of multiple metering enclosures that are to be connected to a meter stack according to an exemplary embodiment of the present disclosure.

FIG. 1A is a front view of multiple metering enclosures that are to be connected to a meter stack according to an exemplary embodiment of the present disclosure.

Figure 1B:
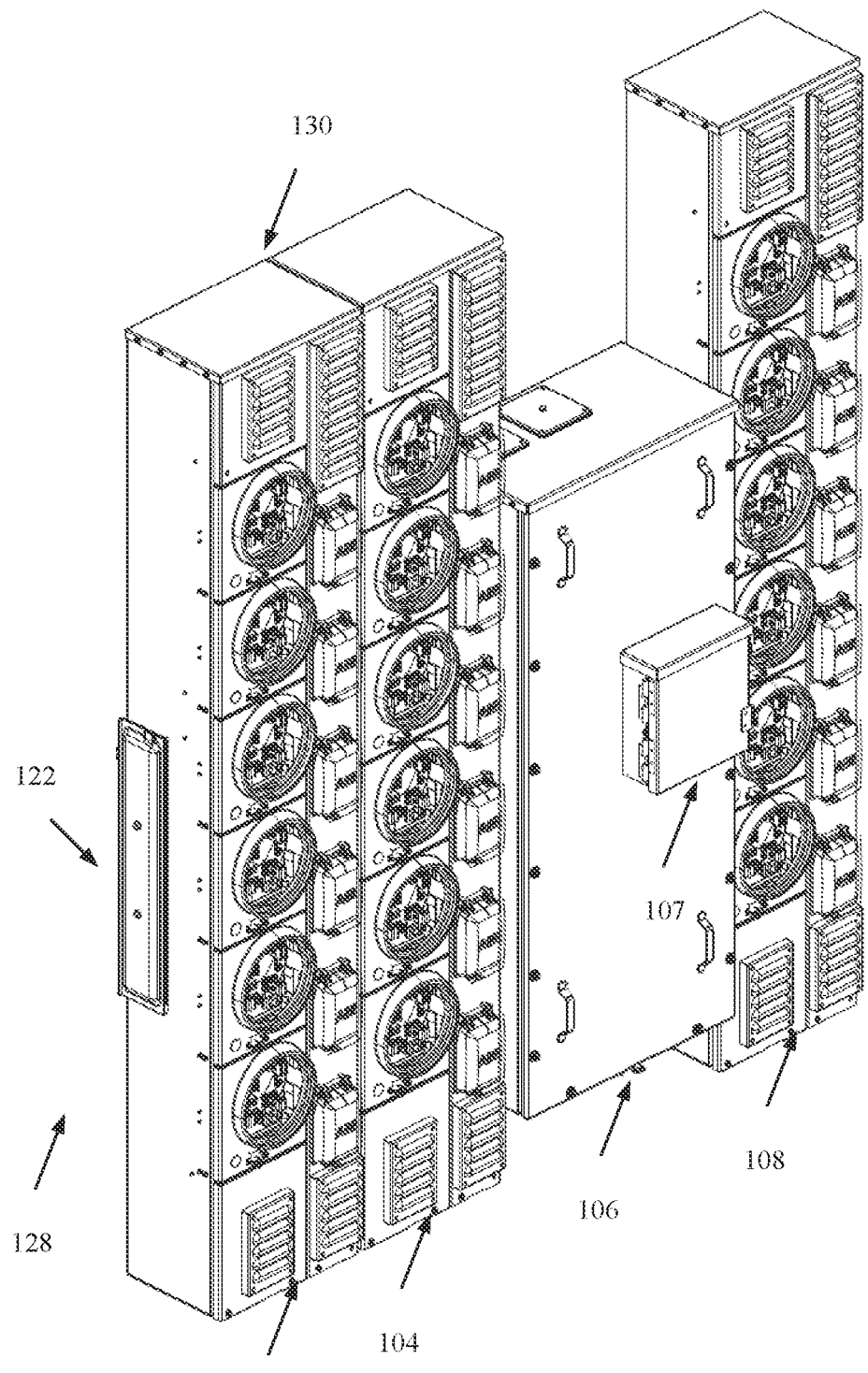
FIG. 1B is a front perspective view of multiple metering enclosures that are to be connected to a meter stack according to an exemplary embodiment of the present disclosure.
Figure 1C:
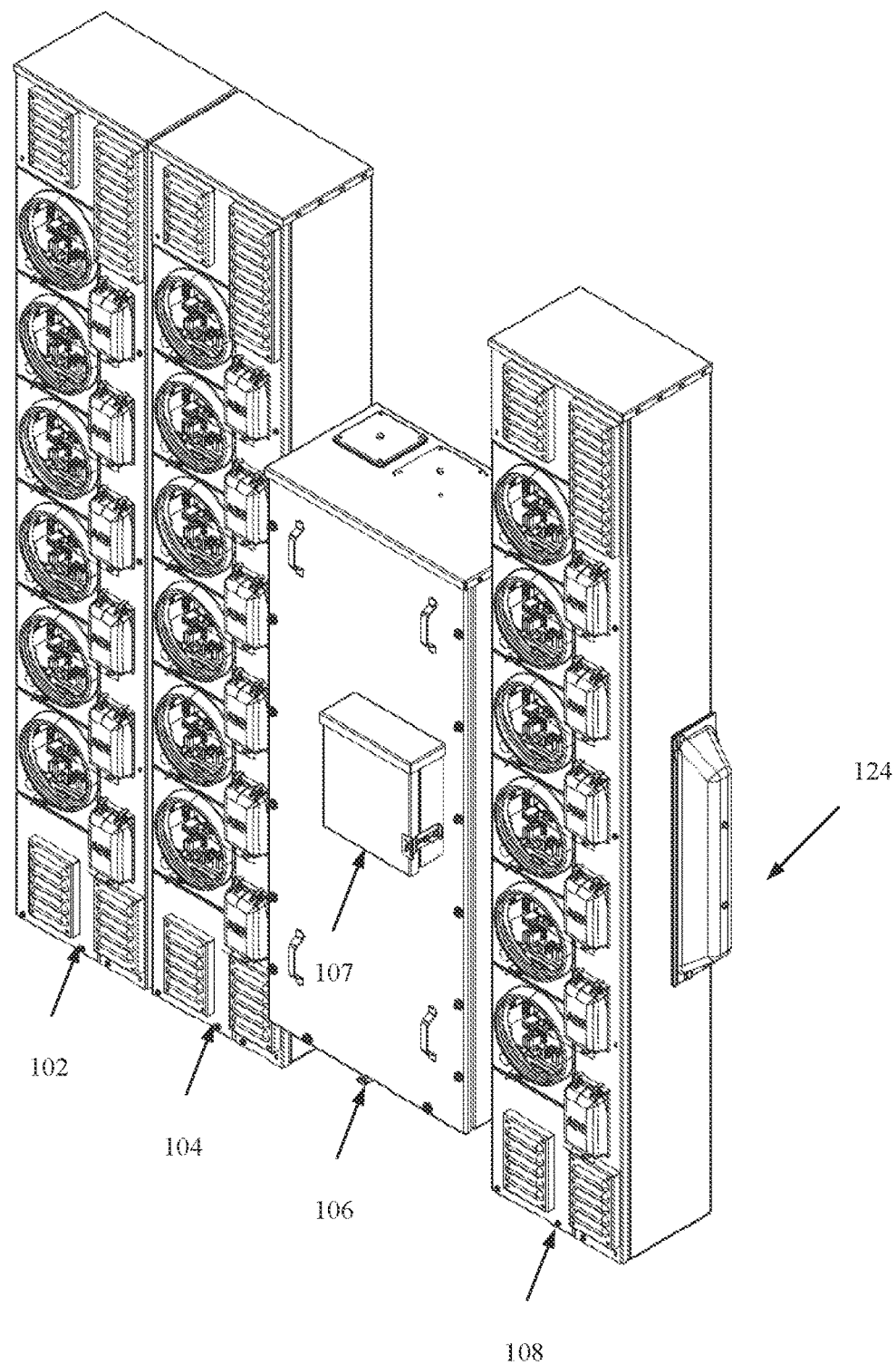
FIG. 1C is another front perspective view of multiple metering enclosures that are to be connected to a meter stack according to an exemplary embodiment of the present disclosure.

As shown, the multiple metering enclosures 100 include, in this case, three metering enclosures 102, 104, and 108, which are ganged together and ready for a meter stack. Between the metering enclosures 104 and 108, there is a main module 106 for connecting the multiple metering enclosures 100, i.e., the entire meter stack, to an electrical service. Additionally and/or alternatively, two metering enclosures and/or more than three metering enclosures can be ganged together for a meter stack. The protruding box located on the main module 106, which is more clearly shown in FIGS. 1B and 1C, is an access cover 107. This access cover 107 allows access to a breaker or a switch handle without removing the whole cover of the main module 106.

In an exemplary embodiment of the present disclosure, in each of the three metering enclosures 102, 104, and 108, there are six individual meter sockets. Additionally and/or alternatively, there may be less than or more than six individual meter sockets in each of the three metering enclosures 102, 104, and 108. For example, in the metering enclosure 102, there are individual meter sockets 110, 112, 114, 116, 118, and 120. In an exemplary embodiment of the present disclosure, the six individual meter sockets 110, 112, 114, 116, 118, and 120 line up vertically and are adjacent to each other. Additionally and/or alternatively, these six individual meter sockets 110, 112, 114, 116, 118, and 120 may be organized in various positions and/or orientations within the metering enclosure 102.

FIG. 1B is a front perspective view of multiple metering enclosures that are to be connected to a meter stack according to an exemplary embodiment of the present disclosure.

As shown, there is a connecting socket 122 with a cover on the left side 128 of the metering enclosure 102. A connecting plug on the right side 130 of the metering enclosure 102 is plugged into a connecting socket on the left side of the metering enclosure 104. Basically, each of the metering enclosures 102, 104, and 108 has a connecting socket on its left side and a connecting plug on its right side to connect with each other, and/or with a main module 106. These connecting sockets and connecting plugs are also shown in FIGS. 2A, 2B, and 2C.

FIG. 1C is another front perspective view of multiple metering enclosures that are to be connected to a meter stack according to an exemplary embodiment of the present disclosure.

As shown, there is a connecting plug 124 with a cover on the right side of the metering enclosure 108. A connecting plug on the right side of the main module 106 plugs in a connecting socket on the left side of the metering enclosure 108. Basically, each of the metering enclosures 102, 104, and 108 has a connecting socket on its left side and a connecting plug on its right side to connect with each other, and/or with a main module 106. These connecting sockets and connecting plugs are also shown in FIGS. 2A, 2B, and 2C.

FIG. 2A includes a front view, a left side view, a right side view, a top view, and a bottom view of a metering enclosure according to an exemplary embodiment of the present disclosure.

As shown in FIG. 2A, the metering enclosure 102 is in its front view, left side view, right side view, top view, and bottom view. From the front view 202 of the metering enclosure 102, six individual meter sockets 110, 112, 114, 116, 118, and 120 are shown within the metering enclosure 102. These individual meter sockets line up vertically and are adjacent to each other. A connecting plug 126 is located on the right side of the metering enclosure 102.

From the left side view 204 of the metering enclosure 102, a connecting socket 122 on the left side of the metering enclosure 102 is shown. The connecting plug 126 and the connecting socket 122 connect the metering enclosure 102 to other metering enclosures such as 104 and 108, and/or to a main module 106 as shown in FIG. 1A. From the left side view 204 of the metering enclosure 102, the six individual meter sockets 110, 112, 114, 116, 118, and 120 are also shown. From the right side view 206 of the metering enclosure 102, the connecting plug 126 on the right side of the metering enclosure 102 is also shown.

The top view 208 and bottom view 210 of the metering enclosure 102 show corresponding details of the metering enclosure 102. For example, the individual meter socket 110 is shown from the top view 208 of the metering enclosure 102.

FIG. 2B is a front perspective view of a metering enclosure according to an exemplary embodiment of the present disclosure.

The six individual meter sockets 110, 112, 114, 116, 118, and 120 within the metering enclosure 102 are shown from a different angle in the front perspective view 212 of FIG. 2B. The connecting socket 122 on the left side of the metering enclosure 102 are also shown from the different angle in the front perspective view 212 of FIG. 2B.

FIG. 2C is another front perspective view of a metering enclosure according to an exemplary embodiment of the present disclosure.

The six individual meter sockets 110, 112, 114, 116, 118, and 120 within the metering enclosure 102 are shown from a different angle in the front perspective view 214 of FIG. 2C. The connecting plug 126 on the right side of the metering enclosure 102 is also shown from the different angle in the front perspective view 214 of FIG. 2C.

FIG. 3A includes a front view and a front perspective view of a metering enclosure without a front cover according to an exemplary embodiment of the present disclosure.

As shown from FIG. 3A, three upstream busbars 306, 308, and 310 connected to a three-phase electric power source are available for the six individual meter sockets 110, 112, 114, 116, 118, and 120 within the metering enclosure 102 to be connected to three different phases. For example, the upstream busbar 306 represents phase A, the upstream busbar 308 represents phase B, and the upstream busbar 310 represents phase C of the three-phase electric power source. As shown, the three upstream busbars 306, 308, and 310 are arranged parallel to each other.

Further, details of the six individual meter sockets 110, 112, 114, 116, 118, and 120 within the metering enclosure 102 are shown from the front view 302 of FIG. 3A.

Furthermore, the six individual meter sockets 110, 112, 114, 116, 118, and 120 within the metering enclosure 102 are shown from a different angle in the front perspective view 304 of FIG. 3A. The connecting plug 126 on the right side of the metering enclosure 102 is also shown from the different angle in the front perspective view 304 of FIG. 3A.

FIG. 3B includes a front view and a front perspective view of internal components of FIG. 3A without an enclosure according to an exemplary embodiment of the present disclosure.

As shown from the front view 302 and the front perspective view 304 of FIG. 3B, each of the six individual meter sockets 110, 112, 114, 116, 118, and 120 has two jumper bars. For example, the individual meter socket 110 within the metering enclosure 102 has jumper bars 312 and 314. The jumper bars 312 and 314 are used to connect two points within an electrical circuit. For example, the jumper bar 312 or 314 connects the individual meter socket 110 with one of the three upstream busbars 306, 308, or 310 connected to a three-phase electric power source.

As shown, the jumper bars 312 and 314 are arranged parallel to each other, and each of the jumper bars 312 and 314 has two ends, an upper end (316 and 320) and a lower end (318 and 322), as shown from the front view 302. As also shown, the two jumper bars 312 and 314 are arranged parallel the three upstream busbars 306, 308, and 310. As can be seen from the front perspective view 304, there is a certain distance between the two jumper bars (312 and 314) and the three upstream busbars (306, 308, and 310) within the metering enclosure 102. Additionally and/or alternatively, the two jumper bars (312 and 314) and/or the three upstream busbars (306, 308, and 310) may have various different arrangements.

Further, details of the six individual meter sockets 110, 112, 114, 116, 118, and 120 within the metering enclosure 102 are shown from the front view 302 and the front perspective view 304 of FIG. 3B.

Furthermore, details of the three upstream busbars 306, 308, and 310 for phases A, B, and C of a three-phase electric power source within the metering enclosure 102 are shown from the front view 302 and the front perspective view 304 of FIG. 3B.

FIG. 4A includes a front view, a left side view, a right side view, and a top view of a meter socket on a phase A-B connection according to an exemplary embodiment of the present disclosure.

From the front view 450 of FIG. 4A and the front view 950 of FIG. 9A, the jumper bars (312 and 314) and the three upstream busbars (306, 308, and 310) are shown. In addition, two phase balancing straps (402 and 408) that connect the jumper bars (312 and 314) of the meter socket 110 with the three upstream busbars (306, 308, and 310) are shown. For example, the phase balancing strap 402 has two ends 416 and 418. One end 416 has two slots (902 and 906) and the other end 418 has a hole 910. One end 416 of the phase balancing strap 402 is connected to the upstream busbar 306 representing phase A by a fastener 404 through one of the two slots, such as the slot 902. The fastener 404 may be a stud. Additionally and/or alternatively, other fasteners may also be used. The other end 418 of the phase balancing strap 402 is connected to the jumper bar 312 by a fastener 406 through the hole 910. The fastener 406 may be a bolt. Additionally and/or alternatively, other fasteners may also be used. The phase balancing strap 402 may be made of Aluminum or Copper. Additionally and/or alternatively, the phase balancing strap 402 may also be made of other materials.

The phase balancing strap 408 has the same design as the phase balancing strap 402, except that they structurally mirror each other. This is more clearly shown in FIGS. 7A and 7B. One end 420 of the phase balancing strap 408 is connected to the upstream busbar 308 representing phase B by a fastener 410 through one of the two slots, such as the slot 502, as shown in FIG. 5A. The fastener 410 may be a stud. Additionally and/or alternatively, other fasteners may also be used. The other end 422 of the phase balancing strap 408 is connected to the jumper bar 314 by a fastener 412 through the hole 510, as shown in FIG. 5A. The fastener 412 may be a bolt. Additionally and/or alternatively, other fasteners may also be used. The phase balancing strap 408 may be made of Aluminum or Copper. Additionally and/or alternatively, the phase balancing strap 408 may also be made of other materials.

As such, the jumper bars 312 and 314 of the meter socket 110 are connected to the phase A and phase B of a three-phase electric power source. A phase A-B connection is made through the two phase balancing straps 402 and 408.

From the left side view 452 and right side view 454 of the meter socket 110 within the metering enclosure 102, the phase balancing straps (402 and 408) that connect the jumper bars (312 and 314) with the upstream busbars (306 and 308) are shown from different angles.

From the top view 456 of the meter socket 110 within the metering enclosure 102, the phase balancing straps (402 and 408) that connect the jumper bars (312 and 314) with the upstream busbars (306 and 308) through the fasteners (404, 406, 410, and 412) are shown from a different angle.

FIG. 4B includes front perspective views of a meter socket on a phase A-B connection according to an exemplary embodiment of the present disclosure.

From the front perspective views 458 and 460 shown in FIG. 4B of the meter socket 110 within the metering enclosure 102, the phase balancing straps (402 and 408) that connect the jumper bars (312 and 314) with the upstream busbars (306 and 308) through the fasteners (404, 406, 410, and 412) are shown from different angles.

FIG. 5A includes a front view, a left side view, and a right side view of a phase balancing strap 408 according to an exemplary embodiment of the present disclosure.

The phase balancing strap 408 connects the jumper bar 314 of the meter socket 110 with the upstream busbar 308. Generally, the phase balancing strap 408 is used to connect the jumper bar 314 of the meter socket 110 with the upstream busbar 310, and to connect the jumper bar 314 of the meter socket 110 with the upstream busbar 308, as shown in FIGS. 4A and 4B.

As shown in FIG. 5A, the phase balancing strap 408 has two ends 420 and 422. On one end 420, there are two slots 502 and 506, which are generally used to connect upstream busbars, for example, the upstream busbars 306, 308, and 310 connected to a three-phase electric power source within the metering enclosure 102 shown in FIGS. 3A and 3B. Each of the two slots 502 and 506 has an opening. The opening of the slot 502 is opposite to the opening of the slot 506.

In an exemplary embodiment of the present disclosure, the slot 502 is horizontal and towards the left hand side, and the slot 506 slopes downward and towards the right hand side. For example, each of the slots 502 and 506 is perpendicular to an imaginary line going from the center of the hole 510 to each slot. An angle of the downward slope for the slot 506 may change based on the shape of the phase balancing strap 408. With this angle, a fastener of an upstream busbar, for example, a stud can easily enter into the slot 506 through the slot opening, when this end 420 of the phase balancing strap 408 is connected from one upstream busbar to another. For example, when connecting this end 420 of the phase balancing strap 408 from the upstream busbar 308 shown in FIG. 4A to the upstream busbar 310 by pivoting the phase balancing strap 408, a stud located on the upstream busbar 310 can easily enter into the slot 506 through the slot opening. Additionally and/or alternatively, other fasteners also may be used.

In an exemplary embodiment of the present disclosure, a first raised element 504 is located next to the slot 502. The first raised element 504 makes sure the phase balancing strap 408 is positioned properly on the upstream busbar 306, 308, or 310 connected to a three-phase electric power source. In addition, securing hardware is generally used to secure the phase balancing strap 408 in a position. The first raised element 504 prevents the phase balancing strap 408 from rotating and/or dislodging if the securing hardware is not completely tightened down and/or becomes loose. The securing hardware generally sits next to a fastener of an upstream busbar. The securing hardware is a nutwasher and/or lockwasher. Additionally and/or alternatively, other securing hardware also may be used.

Likewise, a second raised element 508 is located next to the slot 506. The second raised element 508 serves the same functions as described with respect to the first raised element 504.

On the other end 422 of the phase balancing strap 408, there is a hole 510, which is generally used to connect to jumper bars, for example, the jumper bars 312 and 314 of an individual meter socket 110 within the metering enclosure 102, as shown in FIG. 3B. This end 422 of the phase balancing strap 408 is fastened to the jumper bar 312 or 314 of the meter socket 110 by a fastener, for example, a bolt through the hole 510. Additionally and/or alternatively, other fasteners also may be used.

When connecting the slot 502 or 506 on the end 420 of the phase balancing strap 408 to one upstream busbar of a three-phase electric power source, the phase balancing strap 408 is rotated around an axis of the hole 510 on the other end 422 of the phase balancing strap 408. That is, the phase balancing strap 408 is pivoted from a position of one upstream busbar into a new position of another upstream busbar of a three-phase electric power source.

Further details of the phase balancing strap 408 can be seen from the front view 550, the left side view 552 and the right side view 554 of FIG. 5A.

FIG. 5B includes bottom perspective views of a phase balancing strap according to an exemplary embodiment of the present disclosure.

The phase balancing strap 408, including the two slots (502 and 506) and their respective first and second raised elements (504 and 508) on one end 420 and the hole 510 on the other end 422, are shown from different angles in the bottom perspective views 556 and 558.

FIG. 6A includes a front view, a left side view, a right side view, and a top view of a phase balancing strap according to an exemplary embodiment of the present disclosure.

As shown from the front view 650, the phase balancing strap 408 has the same design from the front as the one shown in FIG. 5A. In contrast to the embodiment of FIG. 5A, a press-fit screw 512 or a press-fit stud 512 is installed in the hole 510 on the other end 422 of the phase balancing strap 408 in the embodiment of FIG. 6A. This can be more clearly seen from the left side view 652, the right side view 654, and the top side view 656 of the phase balancing strap 408. Additionally and/or alternatively, other types of fasteners may also be installed in the hole 510 on the other end 422 of the phase balancing strap 408.

With the press-fit screw 512 installed in the hole 510, it is easier to align the phase balancing strap 408 in a hole of the meter socket 110 within the metering enclosure 102. For example, free rotation of the first and second raised elements (504 or 508) on a screw within the hole 510 of the phase balancing strap 408 is avoided. No other tools are needed to prevent rotation of the screw while tightening a nut. This eases the process of connecting the jumper bar 314 of the meter socket 110 with the upstream busbar 308 from the upstream busbar 310 using the phase balancing strap 408.

FIG. 6B includes front perspective views of a phase balancing strap according to an exemplary embodiment of the present disclosure.

The phase balancing strap 408, including the two slots (502 and 506) and their respective first and second raised elements (504 and 508) on one end 420 and the press-fit screw 512 installed in the hole 510 on the other end 422, are shown from different angles in the front perspective views 658 and 660 of FIG. 6B.

FIG. 7A includes a front view, a left side view, a right side view, and a top view of a meter socket on a phase A-C connection according to an exemplary embodiment of the present disclosure.

As shown in FIG. 7A, the meter socket 110 within the metering enclosure 102, and the two phase balancing straps (402 and 408) that connect the jumper bars (312 and 314) of the meter socket 110 with the three upstream busbars (306, 308, and 310) connected to a three-phase electric power source are the same as described with reference to FIG. 4A.

From the front view 750 of the meter socket 110, one end 420 of the phase balancing strap 408 is connected to the upstream busbar 310 representing phase C by a fastener 414 through one of the two slots, for example, the slot 506 as shown in FIG. 5A. The fastener 414 may be a stud. Additionally and/or alternatively, other fasteners may be also used. For example, the end 420 of the phase balancing strap 408 is connected with the upstream busbar 308 shown in FIG. 4A by a fastener 410. Then, the end 420 of the phase balancing strap 408 is moved to the upstream busbar 310 by rotating the phase balancing strap 408 around an axis of the hole 510 on the other end 422 of the phase balancing strap 408. The fastener 414 located on the upstream busbar 310 enters into one slot, for example, the slot 506 as shown in FIG. 5A, through the slot opening on the end 420. Securing hardware, such as nutwasher and lockwasher, next to the fastener 414 is used to tighten down the phase balancing strap 408 in position on the upstream busbar 310.

The other end 422 of the phase balancing strap 408 is still connected to the jumper bar 314 of the meter socket 110 by a fastener 412 through the hole 510. The fastener 412 may be a bolt. Additionally and/or alternatively, other fasteners may be also used.

As such, the jumper bar 314 of the meter socket 110 is connected to the upstream busbar 310 representing phase C. With the jumper bar 312 of the meter socket 110 remaining connected to the upstream busbar 306 representing phase A by the phase balancing strap 402, as described with reference to FIG. 4A, a phase A-C connection is made through the two phase balancing straps 402 and 408.

From the left side view 752 and right side view 754 of the meter socket 110 of FIG. 7A, the phase balancing straps (402 and 408) that connect the jumper bars (312 and 314) with the upstream busbars (306 and 310) are shown from different angles.

From the top view 756 of the meter socket 110 within the metering enclosure 102, the phase balancing straps (402 and 408) that connect the jumper bars (312 and 314) with the upstream busbars (306 and 310) through the fasteners (404, 406, 414, and 412) are shown from a different angle.

FIG. 7B includes front perspective views of a meter socket on a phase A-C connection according to an exemplary embodiment of the present disclosure.

From the front perspective views 758 and 760 of the meter socket 110 of FIG. 7B, the phase balancing straps (402 and 408) that connect the jumper bars (312 and 314) with the upstream busbars (306 and 310) through the fasteners (404, 406, 414, and 412) are shown from different angles.

FIG. 8A includes a front view, a left side view, a right side view, and a top view of a meter socket on a phase B-C connection according to an exemplary embodiment of the present disclosure.

As shown in FIG. 8A, the meter socket 110 within the metering enclosure 102, and the two phase balancing straps (402 and 408) that connect the jumper bars (312 and 314) of the meter socket 110 with the three upstream busbars (306, 308, and 310) connected to a three-phase electric power source are the same as described with reference to FIGS. 4A and 7A.

As shown in the front view 850 of FIG. 8A and the front view 950 of FIG. 9A, one end 416 of the phase balancing strap 402 is connected to the upstream busbar 308 representing phase B by a fastener 410 through one of the two slots, such as the slot 906. For example, the end 416 of the phase balancing strap 402 with two slots (902 and 906) is moved from the fastener 404 of the upstream busbar 306 shown in FIGS. 4A and 7A to the upstream busbar 308 by rotating the phase balancing strap 402 around an axis of the hole 910 on the other end 418 of the phase balancing strap 402. The fastener 410 located on the upstream busbar 308 enters into the slot 906 through the slot opening on the end 416. Securing hardware, such as a nutwasher and/or lockwasher, next to the fastener 410 is used to tighten down the phase balancing strap 402 in position on the upstream busbar 308.

The other end 418 of the phase balancing strap 402 is still connected to the jumper bar 312 of the meter socket 110 by a fastener 406 through the hole 910.

As such, the jumper bar 312 of the meter socket 110 is connected to the upstream busbar 308 representing phase B. With the jumper bar 314 of the meter socket 110 remaining connected to the upstream busbar 310 representing phase C by the phase balancing strap 408, as described with reference to FIG. 7A, a phase B-C connection is made through the two phase balancing straps 402 and 408.

From the left side view 852 and right side view 854 of FIG. 8A, the phase balancing straps (402 and 408) that connect the jumper bars (312 and 314) with the upstream busbars (308 and 310) are shown from different angles.

From the top view 856 of FIG. 8A, the phase balancing straps (402 and 408) that connect the jumper bars (312 and 314) with the upstream busbars (308 and 310) through the fasteners (410, 406, 414, and 412) are shown from a different angle.

FIG. 8B includes front perspective views of a meter socket on a phase B-C connection according to an exemplary embodiment of the present disclosure.

From the front perspective views 858 and 860 of FIG. 8B, the phase balancing straps (402 and 408) that connect the jumper bars (312 and 314) with the upstream busbars (308 and 310) through the fasteners (410, 406, 414, and 412) are shown from different angles.

FIG. 9A includes a front view, a left side view, and a right side view of a phase balancing strap according to an exemplary embodiment of the present disclosure.

The phase balancing strap 402 that connects the jumper bar 312 of the meter socket 110 with the upstream busbar 308, as shown in FIG. 8A, is the same as the phase balancing strap 408. These two phase balancing straps 402 and 408 structurally mirror each other. When viewed from the front, the phase balancing strap 402 has the same components as those of the phase balancing strap 408 described with reference to FIG. 5A. For example, the phase balancing strap 402 has two ends 416 and 418. On one end 416 of the phase balancing strap 402, there are two slots 902 and 906 that are generally used to connect to an upstream busbar of a three-phase electric power source by a fastener. Each of the slots 902 and 906 has an opening opposite to the other. The opening of the slot 902 is downward sloping and towards the left hand side while the opening of the slot 906 is horizontal and towards the right hand side. Raised elements, for example, raised elements 904 and 908 are located respectively next to each of the slots 902 and 906 for positioning the phase balancing strap 402 properly.

On the other end 418 of the phase balancing strap 402, there is a hole 910, which is generally used to connect to an individual meter socket, for example, the meter socket 110 through a jumper bar, for example, the jumper bar 312 or 314, as shown in FIG. 3B, by a fastener. When connecting the slot 902 or 906 from one upstream busbar to another upstream busbar, the phase balancing strap 402 is rotated around an axis of the hole 910.

The phase balancing strap 402 from different views is shown from the left side view 952 and the right side view 954.

FIG. 9B includes bottom perspective views of a phase balancing strap according to an exemplary embodiment of the present disclosure.

The phase balancing strap 402, including the two slots (902 and 906) and their respective raised elements (904 and 908) on one end 416 and the hole 910 on the other end 418, are shown from different angles in the bottom perspective views 956 and 958.

FIG. 10A includes a front view, a left side view, a right side view, and a top view of a phase balancing strap according to an exemplary embodiment of the present disclosure.

As shown from the front view 1050 of the phase balancing strap 402, the phase balancing strap 402 has the same design from the front as the one shown in FIG. 9A. In contrast to the embodiment of FIG. 9A, a press-fit screw 912 or a press-fit stud 912 is installed in the hole 910 on the other end 418 of the phase balancing strap 402. This can be more clearly seen from the left side view 1052, the right side view 1054, and the top side view 1056 of FIG. 10A. Additionally and/or alternatively, other types of fasteners may be also installed in the hole 910 on the other end 418 of the phase balancing strap 402.

With the press-fit screw 912 installed in the hole 910, a process of connecting the jumper bar 312 of the meter socket 110 with the upstream busbar 308 from the upstream busbar 306 by using the phase balancing strap 402 eases up.

FIG. 10B includes front perspective views of a phase balancing strap according to an exemplary embodiment of the present disclosure.

The phase balancing strap 402, including the two slots (902 and 906) and their respective raised elements (904 and 908) on one end 416 and the press-fit screw 912 installed in the hole 910 on the other end 418, are shown from different angles in the front perspective views 1058 and 1060 of FIG. 10B.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of the present disclosure are described herein, including the best mode known to the inventors for carrying out the disclosure. Variations of those exemplary embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, the present disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An electrical system, comprising:
a three-phase electric power source, wherein the three-phase electric power source comprises a second upstream busbar disposed between and extending in parallel to a first upstream busbar and a third upstream busbar;
a meter socket; and
a pair of straps, the pair of straps including a first strap and a second strap that are structurally mirror image with each other, wherein each of the first and second straps comprises:
a first end, wherein the first end comprises a hole and is connectable to the meter socket by a respective first fastener through the hole; and
a second end, wherein the second end comprises a first slot with an opening and a second slot with an opening, and wherein the opening of the first slot is opposite to the opening of the second slot;
wherein, when the second strap is connected to the third upstream busbar, the second end of the first strap is connectable either to the first upstream busbar by a second fastener through the first slot of the first strap, or to the second end of the first strap is connectable to the second upstream busbar by a third fastener through the second slot of the first strap, and
wherein, when the first strap is connected to the first upstream busbar, the second end of the second strap is connectable either to the second upstream busbar by the third fastener through the second slot of the second strap, or to the third upstream busbar by a fourth fastener through the first slot of the second strap.

2. The electrical system of claim 1, wherein the hole of the first end of each of the straps is round and the respective first fastener is a bolt.

3. The electrical system of claim 1, wherein each of at least one of the respective first fastener is a press-fit screw or a press-fit stud, each of the press-fit screw or the press-fit stud is installed in the hole of the first end of a corresponding one of the straps.

4. The electrical system of claim 1, wherein each of the pair of straps further comprises a plurality of raised elements, a first raised element of the raised elements is located on a side of the opening of the first slot and a second raised element of the raised elements is located on a side of the opening of the second slot.

5. The electrical system of claim 4, wherein:
a first securing hardware configured to be used to fasten the first strap, the first securing hardware is located next to:
the first raised element of the first strap when the second end of the first strap is connected to the first upstream busbar by the second fastener through the first slot of the first strap, and
the second raised element of the first strap when the second end of the first strap is connected to the second upstream busbar by the third fastener through the second slot of the first strap, and
a second securing hardware configured to be used to fasten the second strap, the second securing hardware is located next to:
the second raised element of the second strap when the second end of the second strap is connected to the second upstream busbar by the third fastener through the second slot of the second strap, and
the first raised element of the second strap when the second end of the second strap is connected to the third upstream busbar by the fourth fastener through the first slot of the second strap.

6. The electrical system of claim 5, wherein each of the first and second securing hardware comprise at least one of nutwasher and lockwasher.

7. A method for balancing phases of an electrical system that includes a second upstream busbar disposed between and extending in parallel to a first upstream busbar and a third upstream busbar, wherein a meter socket of the electrical system is connected to a first end of each of a pair of straps by a respective first fastener through a hole of the first end of each of the pair of straps, the pair of straps including a first strap and a second strap, the first strap and the second strap being structurally mirror image with each other, the first strap being connectable to one of the first upstream busbar or the second upstream busbar, the second strap being connectable to the second upstream busbar or the third upstream busbar, the method comprising:
when the second strap is connected to the third upstream busbar, loosening a second fastener, by which one of the first upstream busbar and the second upstream busbar of the electrical system is connected to a second end of the first strap through one of a first slot and a second slot of the second end of the first strap; and
rotating the first strap around an axis of the hole of the first end of first strap to a position of another of the first upstream busbar and the second upstream busbar of the electrical system, and connecting the second end of the first strap to the another of the first upstream busbar and the second upstream busbar of the electrical system by a third fastener through another of the first slot and the second slot of the second end of the first strap,
wherein each of the first slot and the second slot of the second end of each of the straps has a respective opening, the respective openings being opposite to each other.

8. The method of claim 7, wherein the third fastener is located on the position of the another of the first upstream busbar and the second upstream busbar and the third fastener is a stud, and wherein the rotating the first strap to the position of the another of the first upstream busbar and the second upstream busbar comprises: entering the stud into the opening of the another of the first slot and the second slot of the second end of the first strap.

9. The method of claim 7, wherein each of at least one of the respective first fastener is a press-fit screw or a press-fit stud, each of the press-fit screw or the press-fit stud is installed in the hole of the first end of a corresponding one of the straps.

10. The method of claim 7, wherein each of the pair of straps further comprises a plurality of raised elements, a first raised element of the raised elements is located on a side of the opening of the first slot and a second raised element of the raised elements is located on a side of the opening of the second slot.

11. The method of claim 10, wherein:
a first securing hardware configured to be used to fasten the first strap, the first securing hardware is located next to:
the first raised element of the first strap when the second end of the first strap is connected to the one of first upstream busbar and the second upstream busbar by the second fastener through the one of the first slot and the second slot of the first strap, and
the second raised element of the first strap when the second end of the first strap is connected to the another of the first upstream bus bar and the second upstream busbar by the third fastener through the another of the first slot and the second slot of the first strap, and
a second securing hardware configured to be used to fasten the second strap, the second securing hardware is located next to the first raised element of the second strap when the second end of the second strap is connected to the third upstream busbar by a fourth fastener through the first slot of the second strap.

12. The method of claim 11, further comprising:
securing the second fastener in the one of the first slot and the second slot of the second end of the first strap to the one of the first upstream busbar and the second upstream busbar using the first securing hardware; or
securing the third fastener in the another of the first slot and the second slot of the second end of the first strap to the another of the first upstream busbar and the second upstream busbar using the first securing hardware.

13. The method of claim 11, wherein each of the first and second securing hardware comprise at least one of nut-washer and lockwasher.

* * * * *